(12) United States Patent
Sasaki et al.

(10) Patent No.: US 9,426,355 B2
(45) Date of Patent: Aug. 23, 2016

(54) IMAGING APPARATUS

(75) Inventors: Isao Sasaki, Chiba (JP); Riuzou Nagatsuka, Tokyo (JP); Emi Arakawa, Tokyo (JP); Tetsuya Asai, Tokyo (JP); Masaki Mikamo, Kanagawa (JP); Takashi Nunomaki, Tokyo (JP); Hisashi Ohashi, Kanagawa (JP); Kenji Tsushio, Chiba (JP); Mayumi Kamiya, Tokyo (JP); Kenji Yoshida, Kanagawa (JP); Takeshi Harada, Tokyo (JP); Keiki Fukuda, Tokyo (JP)

(73) Assignee: Sony Corporation, Tokyo (JP)

( * ) Notice: Subject to any disclaimer, the term of this patent is extended or adjusted under 35 U.S.C. 154(b) by 845 days.

(21) Appl. No.: 13/540,407

(22) Filed: Jul. 2, 2012

(65) Prior Publication Data
US 2012/0311483 A1    Dec. 6, 2012

Related U.S. Application Data

(62) Division of application No. 10/554,093, filed as application No. PCT/JP2004/007119 on May 19, 2004, now Pat. No. 8,214,761.

(30) Foreign Application Priority Data

May 19, 2003    (JP) .................................. 2003-140995

(51) Int. Cl.
| | |
|---|---|
| *G06F 3/048* | (2013.01) |
| *H04N 5/232* | (2006.01) |
| *H04N 1/00* | (2006.01) |
| *H04N 101/00* | (2006.01) |

(52) U.S. Cl.
CPC ....... *H04N 5/23216* (2013.01); *H04N 1/00416* (2013.01); *H04N 1/00509* (2013.01); *H04N 5/23293* (2013.01); *H04N 2101/00* (2013.01)

(58) Field of Classification Search
None
See application file for complete search history.

(56) References Cited

U.S. PATENT DOCUMENTS

| | | | |
|---|---|---|---|
| 6,133,915 A | 10/2000 | Arcuri et al. | |
| 6,263,217 B1 | 7/2001 | Park | |
| 7,032,188 B2 * | 4/2006 | Salmimaa et al. | 715/864 |
| 2003/0179928 A1 * | 9/2003 | Kusama | H04N 1/3875 382/180 |
| 2003/0228864 A1 * | 12/2003 | Tanaka | H04N 1/00132 455/422.1 |
| 2005/0206746 A1 * | 9/2005 | Cazier et al. | 348/231.2 |

FOREIGN PATENT DOCUMENTS

| | | |
|---|---|---|
| JP | 03-019019 A | 1/1991 |
| JP | 05-176393 A | 7/1993 |
| JP | 09-305360 A | 11/1997 |
| JP | 10-187404 A | 7/1998 |
| JP | 10-187669 A | 7/1998 |

(Continued)

OTHER PUBLICATIONS

Japanese Office Action issued Jun. 18, 2007 for corresponding Japanese Application No. 2003-140995.

(Continued)

*Primary Examiner* — Thanh Vu
(74) *Attorney, Agent, or Firm* — Michael Best and Friedrich LLP

(57) ABSTRACT

An imaging apparatus generates a GUI screen image for operating the imaging apparatus. A controller controls the generation of the GUI screen image upon detecting a predetermined operation.

8 Claims, 25 Drawing Sheets

(56) References Cited

FOREIGN PATENT DOCUMENTS

| | | |
|---|---|---|
| JP | 11-126147 A | 5/1999 |
| JP | 2000-105654 A | 4/2000 |
| JP | 2000-115627 A | 4/2000 |
| JP | 2000-152039 A | 5/2000 |
| JP | 2001-086487 A | 3/2001 |
| JP | 2001-199312 A | 7/2001 |
| JP | 2001-208961 A | 8/2001 |
| JP | 2002-108532 A | 4/2002 |
| JP | 2002-158953 A | 5/2002 |
| JP | 2002-171436 A | 6/2002 |
| JP | 2002-229705 A | 8/2002 |
| JP | 2002-247417 A | 8/2002 |
| JP | 2003-108280 A | 4/2003 |
| JP | 2003-244484 A | 8/2003 |
| JP | 2003-344929 A | 12/2003 |

OTHER PUBLICATIONS

Korean Office Action issued Feb. 18, 2010 for corresponding Korean Application No. 10-2005-7022017.

Japanese Office Action; Application No. 2003-40995; Dated: Mar. 26, 2007.

* cited by examiner

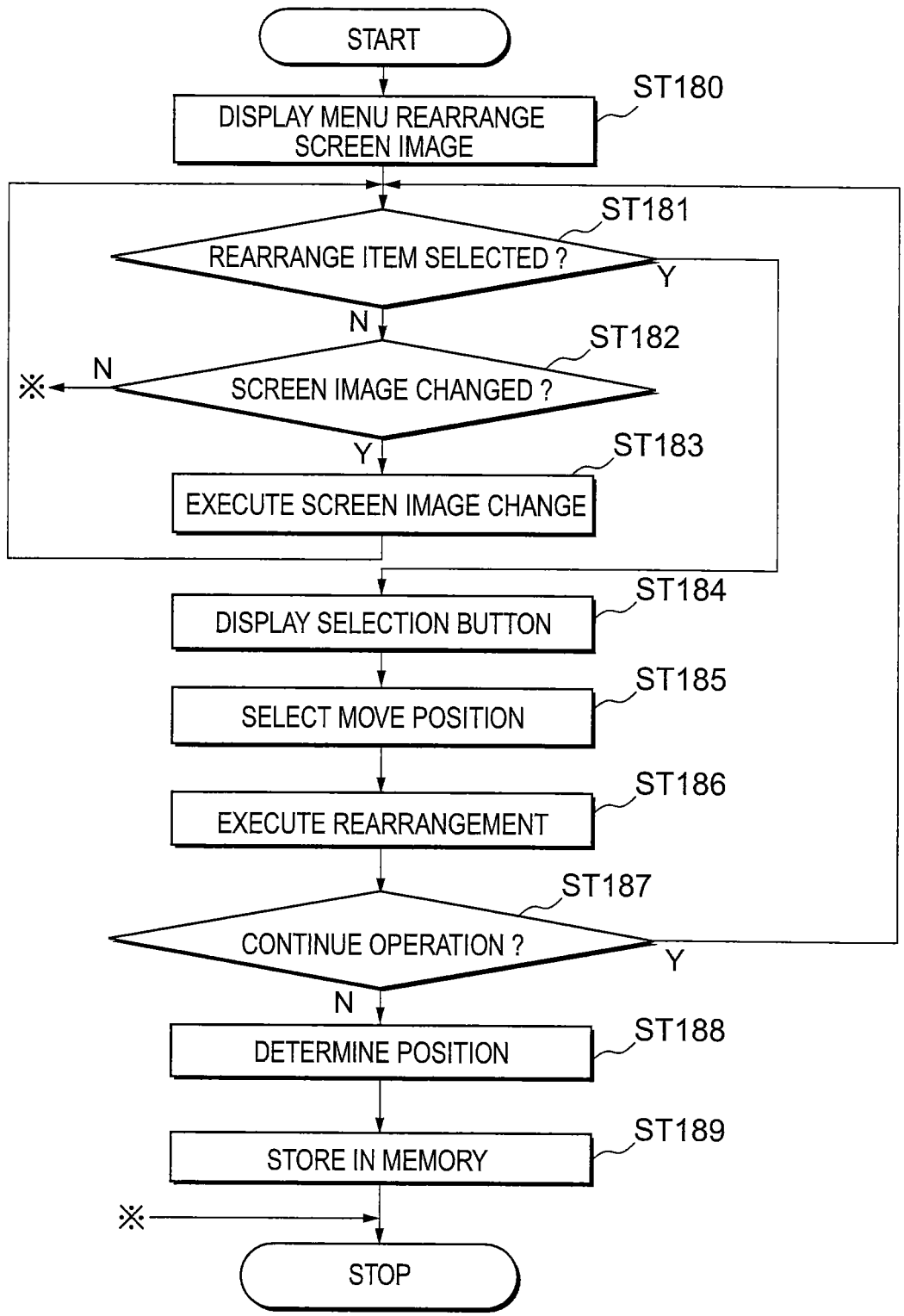

FIG. 15A
FIG. 15B
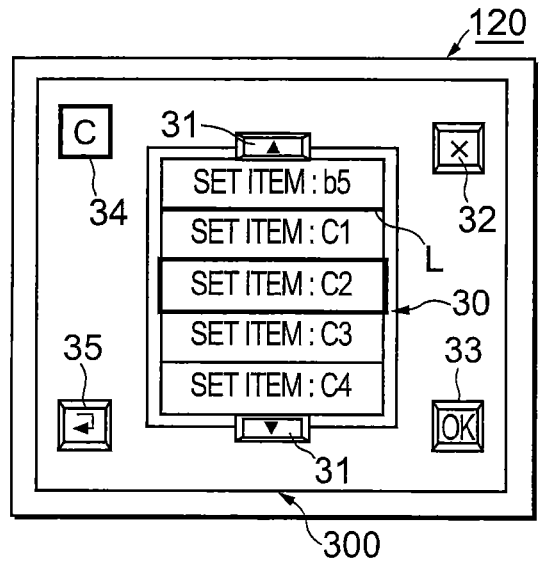
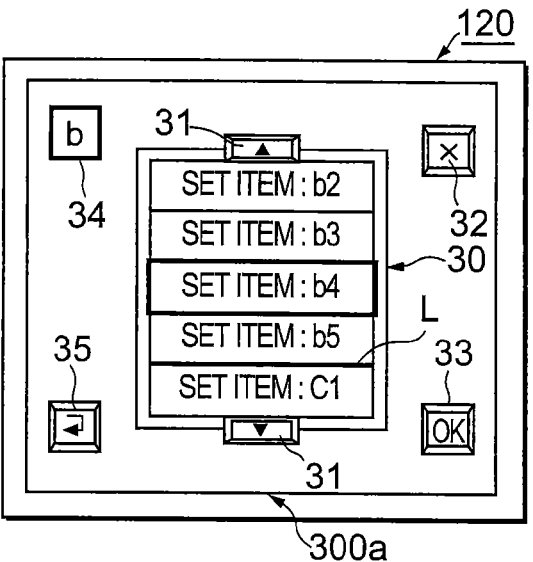
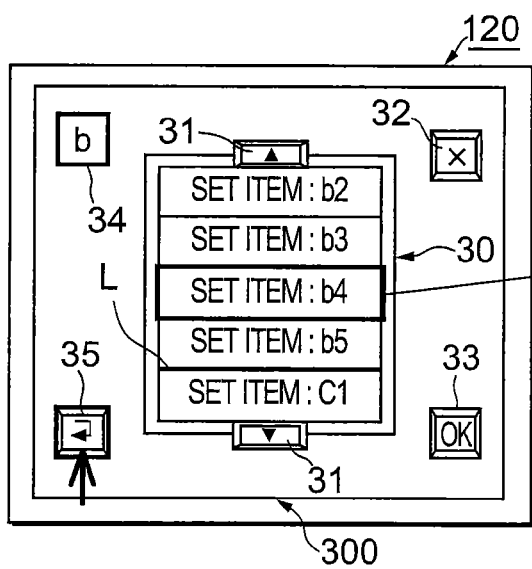
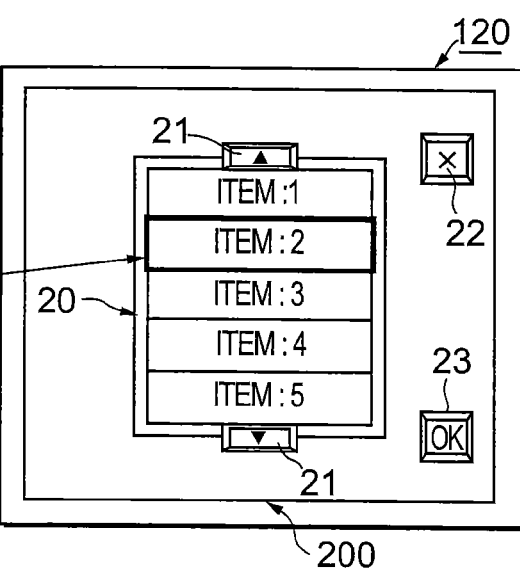
(a)                      (b)
FIG. 16

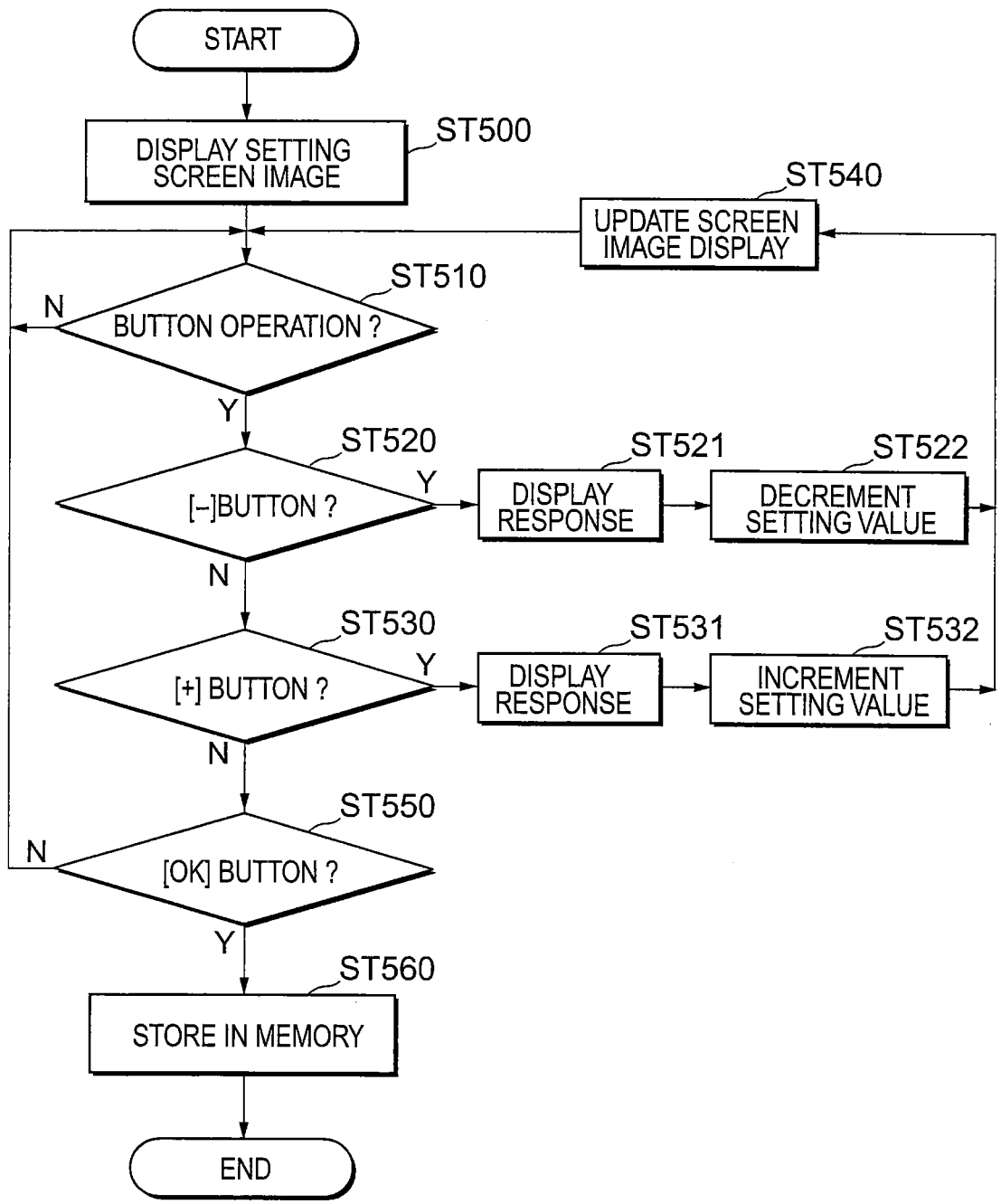

IMAGING APPARATUS

CROSS REFERENCES TO RELATED APPLICATIONS

This is a Divisional Application of the patent application Ser. No. 10/554,093, filed Oct. 21, 2005, now U.S. Pat. No. 8,214,761, which is based on a National Stage Application of PCT/JP2004/007119, filed May 19, 2004, which in turn claims priority from Japanese Application No.: 2003-140995, filed on May 19, 2003, the entire contents of which are incorporated herein by reference.

TECHNICAL FIELD

The present invention relates to an imaging apparatus. In detail, the present invention relates to an imaging apparatus, in which the operability and visibility at the time of setting and adjusting functions of the imaging apparatus are improved.

BACKGROUND ART

In recent years, in an imaging apparatus, in association with the improvement of functions and performances, items to be set by a user are increased.

For this reason, methods for easily setting a target function are variously devised. Usually, a hierarchy type menu method is used for managing index information, in which setting items and adjusting items of the imaging apparatus are classified into hierarchy type predetermined categories, and this index information is displayed in stages, and then a target item is selected.

In the hierarchy type menu method, at first, a list table of index information corresponding to classified categories is displayed as [Main Menu], and when desired index information is selected from this [Main Menu], there is further [Sub-Menu] in this [Main Menu], that is a menu on and after second rank of a hierarchy, and there is further a plurality of items in this [Sub-Menu]. In this way, each menu has a plurality of hierarchies. Then, the staged selection of the items displayed in the menu enables a user to set a desired item or function. (For example, refer to Japanese Laid Open Patent Application No. JP H9-305360 (pp. 3-4, FIG. 2).)

However, the function setting method based on the conventional hierarchy type menu method and the like has a problem that the operability and visibility at the time of setting, adjusting, and displaying the function of the apparatus are poor (which will be pointed out in 1) to 8) below).

1) In the conventional hierarchy type menu method, as the setting items are increased, the classified categories are also increased. Consequently, the index information displayed on [Main Menu] and the hierarchy rank number of the [Sub-Menu] are increased. Thus, the number of the steps until reaching a target setting screen image is increased, and accordingly, it becomes difficult to search a necessary item or function.

2) Therefore, by selecting the setting items and adjustment items which are frequently used by a user, a customized [Personal Menu] can be provided so that the user is able to select items or functions to be frequently executed with the small number of the steps. However, it is difficult to search, only with the [Personal Menu], a necessary item or function, such as when selecting another item or function that is not registered in the [Personal Menu], when adding a new item or function to the [Personal Menu], or in other cases.

3) In order to select the item or function which belongs to index information different from the index information selected from the menu, a procedure including such as once moving to that menu screen image, again selecting the target index information, and then displaying the item or function belonging to that index information is required.

4) In a case where two buttons including a button to determine the change in the setting or to advance to a next screen image (hereafter, referred to as a [Execute] button) and a button to return to a screen image displayed before the setting screen image (hereafter, referred to as a [Return] button) are displayed on the setting screen image to set an item or function, there is a problem that it is difficult to understand only by viewing the screen image display, for example, such as a case where it is not known whether or not the operation of the setting change is executed; a case where after the setting change is determined, the setting can not be returned back to the original condition even if the [Return] button is operated; a case where it is not known which of the buttons can be operated; or a case where the result after the execution of the operation of the selected button is not obvious.

5) In the setting screen image that is displayed when a setting value is set, an available range for setting values is divided into constant intervals or intervals based on a logarithmic function such as decibel values so as to increase and decrease the setting value on the basis of the divided intervals, and character information and graphic are used to carry out the screen image display. However, the setting range includes a range to be finely set, a range to be roughly set and the like. Its range is also different depending on each setting value, thus such a screen image display has a problem that it is intuitively unintelligible and the setting operation is difficult.

6) In association with the increase in the items and functions to be set, when they are displayed on the screen by using character information, icons, and the like, there is a problem that they can not be displayed on a single screen image, or an icon for a setting item which is unnecessary depending on the condition of the apparatus is displayed. Also, in a case where the display positions and display orders of the character information, the icons, and the like are defined, there are also similar problems.

7) In the conventional imaging apparatus, the execution of a certain operation A causes a screen image A based on the operation A to be transparently displayed on a screen image currently being displayed, and the further execution of another operation B ends the screen image A that is transparently displayed and causes a screen image B based the operation B to be transparently displayed on the screen image currently being displayed. However, this has a problem that the display condition on the screen image is greatly changed so that the user significantly feels uncomfortable and anxiety.

For example, as shown in FIG. 29A, under a condition that an imaged screen image 900 currently being imaged is displayed on a display 120A, if an operation of [Setting of Exposure Correction] is executed, as shown in FIG. 29B, a GUI screen image for the [Setting of Exposure Correction] is transparently displayed on the imaged screen image 900.

Moreover, under the condition of a screen image 900A on which the GUI screen image for the [Setting of Exposure Correction] is transparently displayed, if the recording of image is triggered to be started, as shown in FIG. 29C, once the transparent display on the GUI screen image for the [Setting of Exposure Correction] is ended, a new message such as [Cassette Is Not Inserted] is transparently displayed on an imaged screen image 900B.

As described above, the displaying condition on the screen which is greatly changed brings significant discomfort and there may occur a problem that the operation during which the screen image is changed is unknown.

8) In a case where there are a plurality of folders in which a plurality of image data are classified and arranged in a recording medium to be set in the imaging apparatus and made into a single unit, under the condition that image data recorded in a certain folder is displayed, it is not possible to change the folder to another folder or to perform a setting such as an erasure prohibition setting and the like on the image data. Thus, this has a problem that the operability to the recorded image data is not excellent.

Thus, there is a problem that must be solved in providing an imaging apparatus, in which the operability and visibility at the time of setting the function of the imaging apparatus are improved.

DISCLOSURE OF INVENTION

In order to solve the above-mentioned problems, an imaging apparatus according to the present invention is to be designed as follows.

(1) An imaging apparatus which includes GUI screen image generating means for generating a GUI screen image having graphical user interface means for operating the apparatus and displaying the GUI screen image on image display means; operating means for operating the GUI screen image displayed on the image display means; and controlling means for controlling the apparatus in accordance with the operation of the GUI screen image by the operating means, in which the imaging apparatus includes storing means for storing hierarchy type main menu information capable of setting and operating desired functions by classifying functions settable and operable in the imaging apparatus on the basis of a predetermined category, displaying index information of the classified functions in stages, and selecting the displayed index information; menu generating means capable of selecting desired index information among the main menu information in the storing means to generate unique menu information; and menu editing means capable of editing the unique menu information generated by the menu generating means, and in which the controlling means controls the GUI screen image generating means when detecting a predetermined operation by the operating means, and the GUI screen image generating means generates the GUI screen image in which the index information to operate the menu editing means is included in the unique menu information, in accordance with the control of the controlling means, and displays the GUI screen image on the image display means.

(2) In the imaging apparatus as described in the above (1), the menu editing means has a function of adding the index information to the unique menu information, a function of deleting the index information, a function of rearranging a displayed position of the index information, and a function of initializing the unique menu information to predetermined menu information.

(3) In the imaging apparatus as described in the above (1), the GUI screen image generating means generates a GUI screen image in which the index information for operating the main menu information is included in the unique menu information to display the GUI screen image on the image display means.

(4) In the imaging apparatus as described in the above (1), the GUI screen image generating means has a function of adding the unique menu information generated by the menu generating means to the index information of the main menu information.

(5) In the imaging apparatus as described in the above (1), the GUI screen image generating means has a function of adding the unique menu information generated by the menu generating means to the index information displayed in any hierarchy of the main menu information.

(6) An imaging apparatus which includes GUI screen image generating means for generating a GUI screen image having graphical user interface means for operating the apparatus and displaying the GUI screen image on image display means; operating means for operating the GUI screen image displayed on the image display means; and controlling means for controlling the apparatus in accordance with the operation of the GUI screen image by the operating means, in which the imaging apparatus includes: storing means having stored therein hierarchy type main menu information capable of setting and operating desired functions by classifying functions settable and operable in the imaging apparatus on the basis of a predetermined category, displaying index information of the classified functions in stages, and selecting the displayed index information, and list information in which setting items corresponding to the index information is arranged in accordance with a display order of the main menu information and can be displayed seamlessly, and in which the controlling means controls the GUI screen image generating means when the selection of the index information is carried out among the main menu information by the operating means, and the GUI screen image generating means generates the GUI screen image for displaying setting items corresponding to the selected index information by the operating means and displays on the image display means.

(7) In the imaging apparatus as described in the above (6), the GUI screen image displaying the setting item corresponding to the index information has a function of scroll-displaying the setting item in accordance with the arrangement of the list information.

(8) In the imaging apparatus as described in the above (6), the GUI screen image displaying the setting item corresponding to the index information carries out a graphic display indicative of its boundary in a case where a setting item of adjacent index information in the main menu is displayed.

(9) In the imaging apparatus as described in the above (6), the GUI screen image displaying the setting item corresponding to the index information displays graphic information indicating the index information from which the setting item is able to be selected in a case where a setting item of adjacent index information in the main menu is displayed.

(10) An imaging apparatus which includes GUI screen image generating means for generating a GUI screen image having graphical user interface means for operating the apparatus and displaying the GUI screen image on image display means; operating means for operating the GUI screen image displayed on the image display means; and controlling means for controlling the apparatus in accordance with the operation of the GUI screen image by the operating means, in which the GUI screen image generated by the GUI screen image generating means displays only a graphical user interface to terminate the GUI screen image when the operation by the operating means is not detected by the controlling means, and displays only a graphical user interface to determine the operation when the operation by the operating means is detected by the controlling means.

(11) An imaging apparatus which includes GUI screen image generating means for generating a GUI screen image having graphical user interface means for operating the apparatus and displaying the GUI screen image on image display means; operating means for operating the GUI screen image displayed on the image display means; and controlling means for controlling the apparatus in accordance with the operation of the GUI screen image by the operating means, in which the imaging apparatus includes storing means for storing graphic data obtained by dividing a range of available setting and adjusting numeric data into a plurality of ranges, setting intervals based on the divided respective ranges, and changing shapes on the basis of this setting interval, the controlling means controls the GUI screen image generating means on detection of a predetermined operation by the operating means, and the GUI screen image generating means reads out the corresponding graphic data from the graphic data stored in the storing means in accordance with the control of the controlling means, and generates the GUI screen image to set the numeric data in accordance with the read out graphic data, and then displays on the image display means.

(12) An imaging apparatus which comprises GUI screen image generating means for generating a GUI screen image having graphical user interface means for operating the apparatus and displaying the GUI screen image on image display means; operating means for operating the GUI screen image displayed on the image display means; and controlling means for controlling the apparatus in accordance with the operation of the GUI screen image by the operating means, in which the imaging apparatus includes storing means for storing graphic data such as characters, figures and the like, representing functions and setting information in the imaging apparatus, table data to define a priority when the graphic data is displayed on the screen, and layout information of the graphic data, the controlling means judges operation states and setting states of the respective components of the imaging apparatus corresponding to the graphic data in accordance with the priority of the table data on detection of a predetermined operation by the operating means, and selects the graphic data to be displayed on the screen among the graphic data, and the GUI screen image generating means generates the GUI screen image in which the selected graphic data is arranged on the basis of the layout information of the storing means in accordance with the control of the controlling means, and then displays on the image display means.

(13) An imaging apparatus which includes GUI screen image generating means for generating a GUI screen image having graphical user interface means for operating the apparatus and displaying the GUI screen image on image display means; operating means for operating the GUI screen image displayed on the image display means; and controlling means for controlling the apparatus in accordance with the operation of the GUI screen image by the operating means, in which the controlling means controls the GUI screen image generating means when detecting a predetermined operation by the operating means, and the GUI screen image generating means generates a GUI screen image in accordance with the operation detected by the controlling means, and overlap-displays the generated GUI screen image on a forefront of the image display means.

(14) In the imaging apparatus as described in the above (13), the GUI screen image generating means generates a message notification screen image based on the operation detected by the controlling means, and overlap-displays the generated message notification screen image on the forefront of the image display means only for a fixed period of time.

(15) In the imaging apparatus as described in the above (13), the GUI screen image generating means has a function of changing the respective GUI screen images into different colors and brightness when a plurality of GUI screen images is overlap-displayed.

(16) An imaging apparatus which includes GUI screen image generating means for generating a GUI screen image having graphical user interface means for operating the apparatus and displaying the GUI screen image on image display means; operating means for operating the GUI screen image displayed on the image display means; and controlling means for controlling the apparatus in accordance with the operation of the GUI screen image by the operating means, in which the imaging apparatus includes folder information obtaining means for obtaining information of a folder in which a plurality of image data recorded in a recording apparatus or a recording medium are classified, arranged, unified, and recorded; index screen image generating means for generating index image information capable of list-displaying diminished images of the image data within the folder; and folder information generating means for generating folder list information within the recording apparatus or the recording medium, the controlling means controls the folder information obtaining means on detection of a predetermined operation by the operating means, the folder information obtaining means obtains the information of the folder from the recording apparatus or recording medium in accordance with the control of the controlling means, the index screen image generating means generates index image information in accordance with the information of the folder obtained by the folder information obtaining means, and the GUI screen image generating means generates the GUI screen image to select and operate the image data within the folder and the folder information generating means in accordance with the index image information generated by the index screen image generating means and displays on the image display means.

(17) In the imaging apparatus as described in the above (16), when the folder information generating means is selected on the GUI screen image generated in accordance with the index image information, the GUI screen image generating means generates the GUI screen image to select a desired folder and alter to it in accordance with the folder list information generated by the folder information GUI means, and displays on the image display means.

(18) In the imaging apparatus as described in the above (17), the GUI screen image generated in accordance with the folder list information has an image data display section capable of displaying the image data within the selected folder.

With the imaging apparatus having the above-mentioned configuration, since the unique menu information includes the menu editing means, it is possible to display the GUI screen image with which generation of the unique menu information or edition of the menu information is easily carried out.

Furthermore, the setting items can be seamlessly scroll-displayed in accordance with the list information, and the relation between the index information (symbol) and the setting item can be displayed on the screen, and the shift to the GUI screen image corresponding to this screen image display is possible. Thus, the GUI screen image having excellent operability can be displayed.

In addition, in the GUI screen image, at the time of selecting or determining the function of the imaging apparatus, only the operable graphical user interface can be displayed on the screen.

Moreover, in accordance with settable and adjustable numeric data, data is provided in which the data range is divided in to a plurality of ranges, predetermined setting intervals based on the respective divided ranges are set, and the shape of the graphic image is changed in accordance with this setting interval. The setting screen image of the numeric data is generated in accordance with this data. Thus, the setting screen image based on each numeric data and excellent in visibility can be displayed.

In addition, it is possible to have graphic data, such as characters, figures and the like, indicative of functions and setting information in the imaging apparatus; table data defining the priority for the time when the graphic data is displayed on the screen; and layout information of the graphic data, and to display, in accordance with those information, only the necessary icons and character information on the basis of the apparatus condition on the screen in a predetermined layout condition.

Additionally, since the GUI screen image and the message screen image are generated on the basis of the operation and are overlap-displayed on the forefront of the image display means, it becomes possible to overlap-display a plurality of screen images.

Furthermore, even in a case where a plurality of folders exist in the storing apparatus and the recording medium, it is possible to display GUI screen image with which the operations for selecting and altering folders and for browsing the image data within the folder become easy.

BRIEF DESCRIPTION OF DRAWINGS

FIG. 9 is a flowchart of a [rearranging] operation when a [Rearrange] button is operated on the GUI screen image shown in FIG. 5.

FIG. 15A to FIG. 15B are explanation views for explaining the GUI screen image displayed in the operation steps of the flowchart in FIG. 13.

FIG. 16 is an explanation view for explaining the GUI screen image displayed in the operation steps of the flowchart in FIG. 13.

FIG. 18 is a flowchart showing the operation steps when numeric data is set in the imaging apparatus shown in FIG. 2.

BEST MODE FOR CARRYING OUT THE INVENTION

An embodiment based on an imaging apparatus according to the present invention will be described below with reference to the attached drawings. However, the drawings are used only for the explanation, and they do not limit the scope of the present invention.

Figure 1:
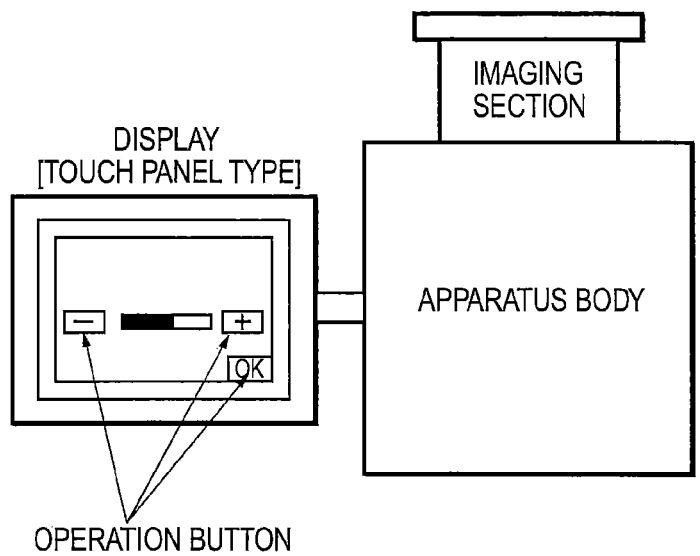
FIG. 1 is one example of an appearance view schematically showing an imaging apparatus according to the present invention.

FIG. 1 exemplifies an appearance of an imaging apparatus of the present invention. The imaging apparatus includes an apparatus body having an imaging section including a CCD (Charge Coupled Device) and the like, and a touch panel type display connected to the apparatus body.

Figure 2:
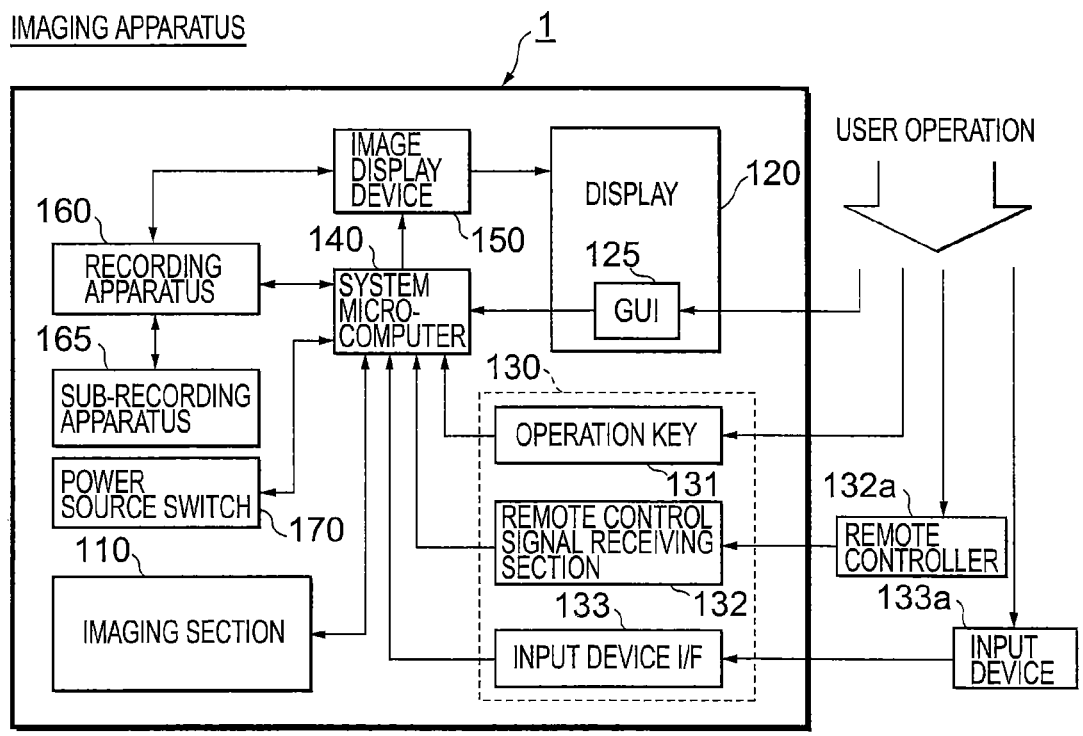
FIG. 2 is an example of a block diagram schematically showing an inner configuration of the imaging apparatus according to the present invention.

FIG. 2 is a block diagram showing a schematic configuration of a main section with regard to the present invention, in the imaging apparatus of FIG. 1, and this main section is provided with an imaging section 110, a display 120, an operating section 130, a system microcomputer 140, an image display device 150, a recording apparatus 160 and a sub-recording apparatus 165, a power switch 170, and the like.

The imaging section 110 captures lights from an object through an imaging lens in accordance with the control of the system microcomputer 140, converts the lights into an electric signal by using the imaging element such as the CCD (Charge Coupled Device) and the like, and sends to the system microcomputer 140 an image signal obtained by applying a predetermined signal processing to the electric signal.

The display 120 includes an LCD panel (Liquid Crystal Display panel) and the like, and displays the image signal and graphic information that are sent through the system microcomputer 140 in accordance with the control of the image display device 150.

In addition, the display 120 is the touch panel (touch panel or touch screen) type display which has a GUI (Graphic User Interface) section 125 for proving a graphical user interface function to send a control signal to the system microcomputer 140, in such a way that when an icon or menu information displayed on the LCD panel is touched, the operation based on the touched item is executed.

The operating section 130 includes an operation key 131, a remote control signal receiving section 132, an input device I/F (interface) 133 and the like, and sends a control signal to the system microcomputer 140 so as to execute a predetermined operation in accordance with the operation by the user.

The operation key 131 is a key placed on the main body in order to operate the imaging apparatus. In accordance with those key operations, the control signal is sent to the system microcomputer 140 so as to execute a predetermined operation. For example, when the operation key 131 is operated to select the icon, the menu information and the like displayed on the display 120, the control signal is sent to the system microcomputer 140 so as to execute the operation in response to the selection.

The remote control signal receiving section 132 receives a key operation signal sent through a wired line or wirelessly (an infrared communication or the like) when the key operation of a remote controller 132a is performed, and sends the control signal based on this key operation signal to the system microcomputer 140.

The input device I/F (interface) 133 is an interface with an input device 133a (for example, a keyboard, a mouse, a dial log, and the like) to operate the apparatus. When the operation of the input device 133a is performed, a control signal in response to this operation is sent to the system microcomputer 140.

The system microcomputer 140 has previously stored therein a basic program (OS: Operating System) for controlling the imaging apparatus; discrete programs for controlling the respective sections; and further, icons designed to represent character information and functions of application programs or types of files; menu (list table) information to set and confirm the functions; graphic information such as screen image data and the like for the screen image display; table data to define an order (priority) to display the individual graphic information; and the like, and has a storing section that contains memories, such as RAM (Random Access Memory), ROM (Read Only Memory) and the like, for storing the setting information set by the user and the like.

And, the system microcomputer controls respective sections within the imaging apparatus on the basis of these programs, the setting information and the like stored in this storing section (memories). In addition, the system microcomputer 140 controls the respective sections within the imaging apparatus in accordance with a control signal from the operating section 130 or the GUI section 125 of the display 120, and the operation mode given by the power switch 170.

The image display device 150 generates, in accordance with the control of the system microcomputer 140, a GUI screen image on the basis of the image signal, graphic information, screen image data, and the like sent through the system microcomputer 140 to display the GUI screen image on the display 120, and also synthesizes (overlaps) those information and data to display them on the display 120.

The recording apparatus 160 and the sub-recording apparatus 165 record the image signal imaged by the imaging section 110 on a recording medium (a memory card, a magnetic tape, an optical disc, or the like), and record the various information (the setting data, and the like) which are sent and received within the imaging apparatus, in accordance with the control by the system microcomputer 140.

The power switch 170 turns on or off the power source supply to the imaging apparatus with a slide return type switch or the like, and also instructs the system microcomputer 140 to change the operation mode indicative of the operation state of the imaging apparatus (for example, a mode to record data on the magnetic tape, a mode to record data on the memory card, or the like).

Figure 3:
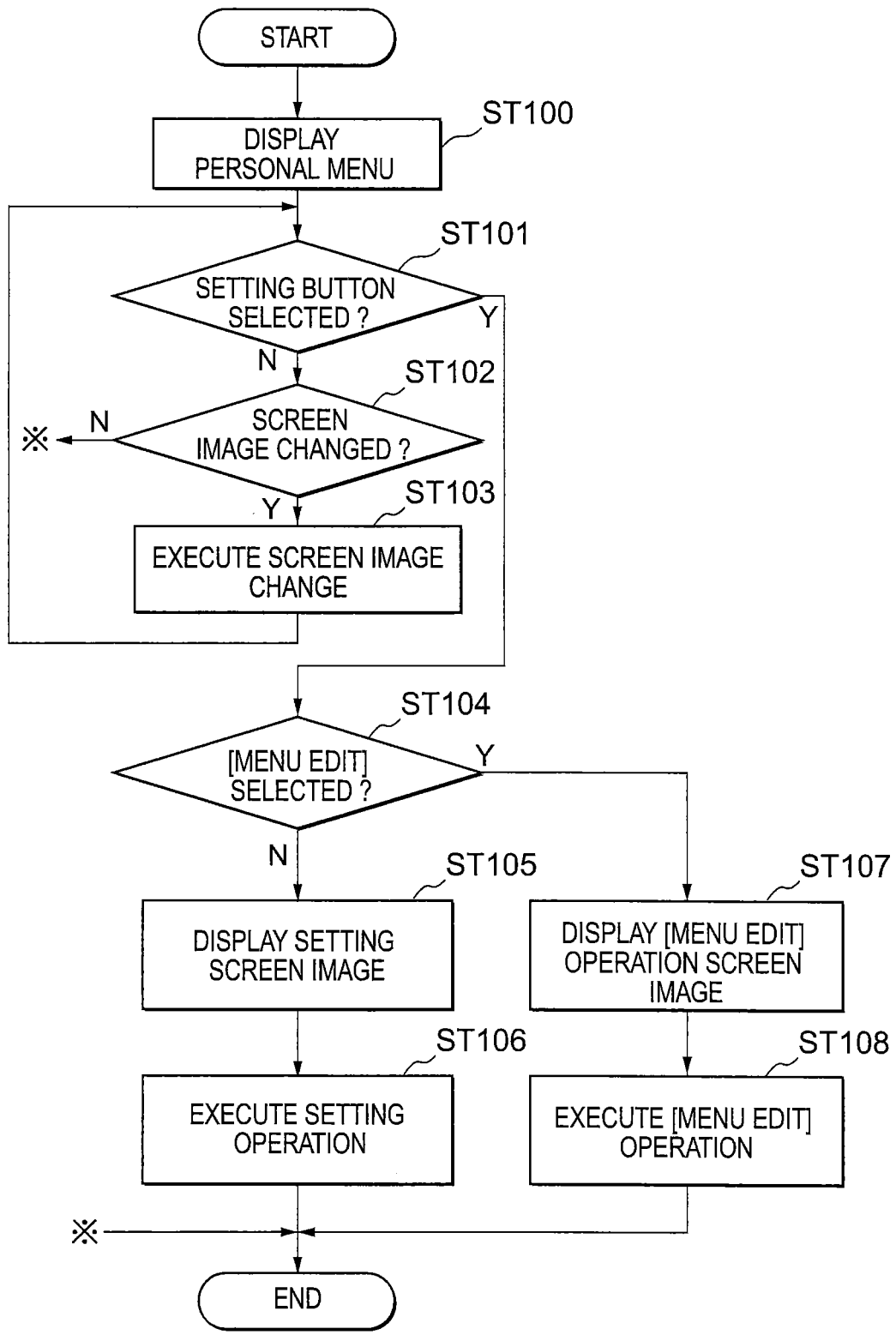
FIG. 3 is a flowchart showing operation steps when [Personal Menu] is edited in the imaging apparatus shown in FIG. 2.

In the imaging apparatus having the above-mentioned configuration, items described in [1] to [8] below will be sequentially explained.
[1]: Edition of Menu Information
[2]: Layout of Menu Information on GUI Screen Image
[3]: Scroll-Display of Menu Item
[4]: GUI Display of Selection/Determination of Operation
[5]: Setting Screen of Numeric Data
[6]: Array Display of Icon and Character Information
[7]: Overlap Display
[8]: Folder Selection It is noted that those processes and operations are executed in accordance with the programs stored in the storing section (memories) of the system microcomputer 140 and the like.
[1]: Edition of Menu Information At first, the operation at the time of editing unique menu information is explained with reference to a flowchart of FIG. 3.

When the operating section 130 is operated or the LCD panel is touched to select a [Personal Menu] from the icon or menu information displayed on the display 120, the system microcomputer 140 controls the image display device 150 in accordance with a control signal from the operating section 130 or the GUI section 125.

The [Personal Menu] is the unique menu information generated by individually selecting setting item frequently used by a user among the setting items for setting the function of the imaging apparatus.

When the [Personal Menu] is selected, the operating section 130 or the GUI section 125 sends out a predetermined control signal to the system microcomputer 140.

The system microcomputer 140 controls the image display device 150 in response to the control signal from the operating section 130 or the GUI section 125, and generates a GUI screen image 100 for the [Personal Menu] on the basis of unique menu information ([Personal Menu]) stored in the storing section (memories) and its image data to display the GUI screen image on the display 120 (ST100).

Figure 4:
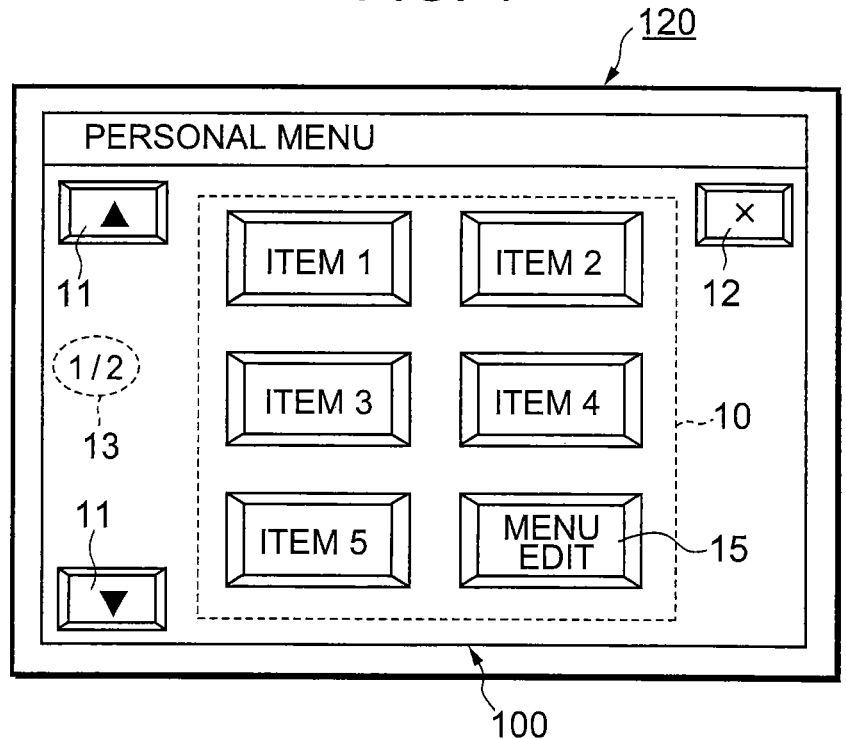
FIG. 4 is an explanation view showing a displaying example of a GUI screen image of the [Personal Menu] in the flowchart of FIG. 3.

For example, as shown in FIG. 4, the GUI screen image 100 is provided with a [Set Item] button group 10 for indicating a setting item that is individually selected among the setting items to set the function of the imaging apparatus, an [Alter] button 11 for altering the GUI screen image to display another

[Set Item] button group 10' in a case where a plurality of setting items exist, a screen image number display section 13 for displaying [a screen image (page) number which is currently displayed]/[entire screen image (page) number] in a case where a plurality of GUI screen images 100 exist, an [End] button 12 for terminating the GUI screen image 100, and the like. The [Set Item] button group 10 includes a [Menu Edit] button 15 to edit and operate the setting item of the [Personal Menu].

Here, in a case where a desired setting item exists in the [Set Item] button group 10 displayed on the GUI screen image 100, the user selects/operates the corresponding [Set Item] button by operating the operating section 130 or touching the LCD panel (ST101).

On the other hand, when the operating section 130 is operated or the LCD panel is touched to select/operate the [Alter] button 11, the system microcomputer 140 generates the GUI screen image 100 composed of another [Set Item] button group 10' stored in the storing section (memories), and then displays it on the display 120 (ST101->ST102->ST103->ST101).

And, when the desired [Set Item] button is selected, the operating section 130 or the GUI section 125 sends out a predetermined control signal to the system microcomputer 140, and the system microcomputer 140 judges whether or not the selected button is the [Menu Edit] button 15 (ST101->ST104).

If the selected button is not the [Menu Edit] button 15, the system microcomputer 140 controls the image display device 150 in response to the control signal from the operating section 130 or the GUI section 125 and displays the GUI screen image corresponding to the selected [Set Item] button on the display 120 so that the desired setting operation can be executed (ST104->ST105, ST106).

On the other hand, if the selected button is the [Menu Edit] button 15, the system microcomputer 140 controls the image display device 150 in response to the control signal from the operating section 130 or the GUI section 125, and generates a GUI screen image 100A to edit and operate the setting item for the [Personal Menu] to display it on the display 120 (ST104->ST107).

Figure 5:
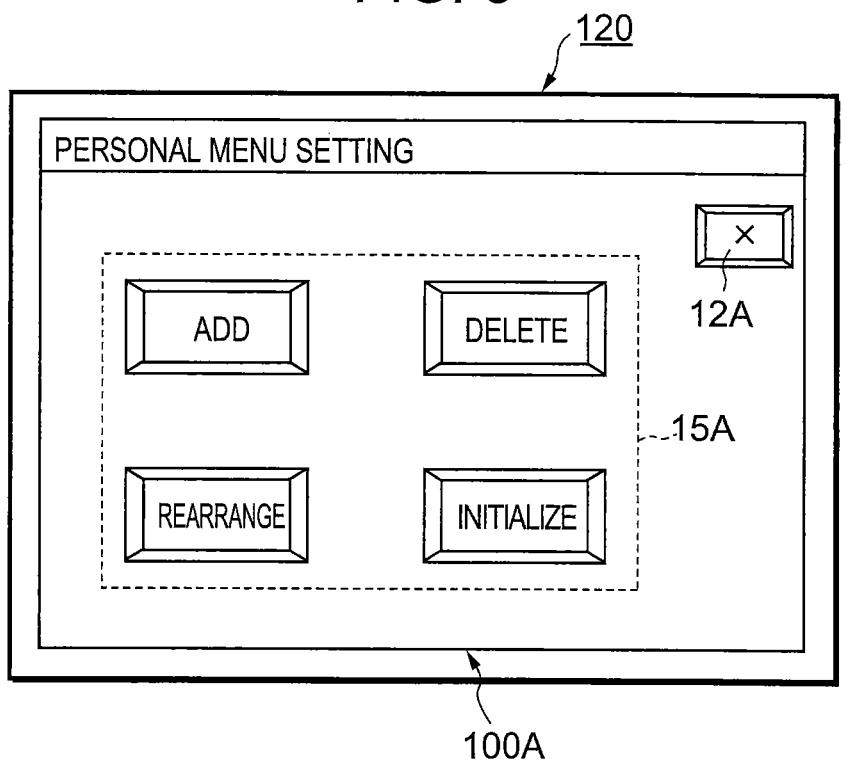
FIG. 5 is an explanation view showing one example of the GUI screen image displayed when an [Edit Menu] button is operated in the [Personal Menu] of FIG. 4.

For example, as shown in FIG. 5, the GUI screen image 100A is provided with an edition button group 15A composed of an [Add] button for adding a new setting item to the [Personal Menu], a [Delete] button for deleting the setting item registered in the [Personal Menu], a [Rearrange] button for rearranging the displayed positions of the setting item buttons on the GUI screen image 100, and an [initialize] button for initializing the setting item, and an [End] button 12A for closing the GUI screen image 100A, and the like.

And, operating the operating section 130 or touching the LCD panel to select a desired editing button from the edition button group 15A enables execution of the editing operation of the [Personal Menu] (ST107->ST108).

In succession, operation at the time of executing the editing operation of the [Personal Menu] from the GUI screen image 100A of FIG. 5 will be explained in accordance with the following (A) to (D).

Figure 6:
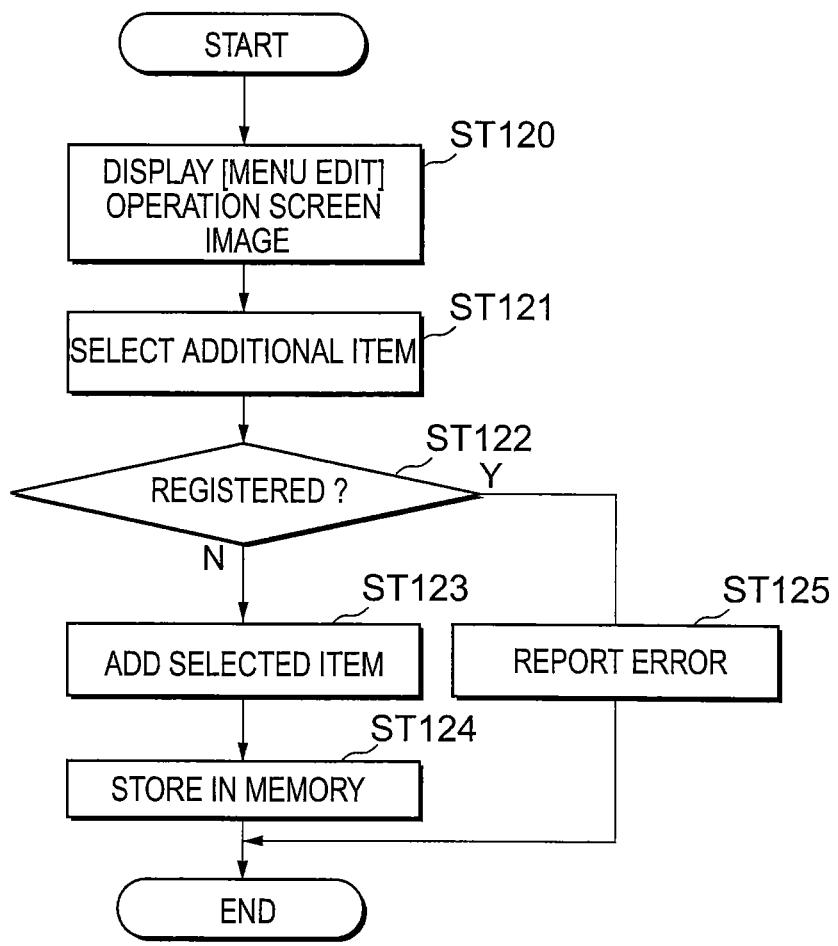
FIG. 6 is a flowchart of an [adding] operation when an [Add] button is operated on the GUI screen image shown in FIG. 5.

(A) Operation for a case where a new [Set Item] button is [Added] to the [Personal Menu] will be explained with reference to a flowchart of FIG. 6.

When the [Add] button is selected from the edition button group 15A on the GUI screen image 100A of FIG. 5, the operating section 130 or the GUI section 125 sends out a predetermined control signal to the system microcomputer 140, and the system microcomputer 140 controls the image display device 150 and displays the GUI screen image displaying the list information for the selection and designation of a setting item to be added on the display 120 (ST120).

Then, a desired setting item to be added to the [Personal Menu] is selected from the list information displayed on the GUI screen image by operating the operating section 130 or touching the LCD panel (ST121).

The operating section 130 or the GUI section 125 sends out a predetermined control signal to the system microcomputer 140 when the desired setting item is selected, and the system microcomputer 140 reads out unique menu information stored in the storing section (memories) and judges whether or not the selected setting item is registered (ST122).

In a case where any corresponding setting item is not registered, the system microcomputer 140 adds the information of this setting item to the read out unique menu information, and writes the unique menu information added with the new setting item to the storing section (memories) (ST122->ST123, ST124).

On the other hand, in a case where the corresponding setting item is already registered, the system microcomputer 140 controls the image display device 150 so as to display an error indication on the display 120 (ST122->ST125).

Figure 7:
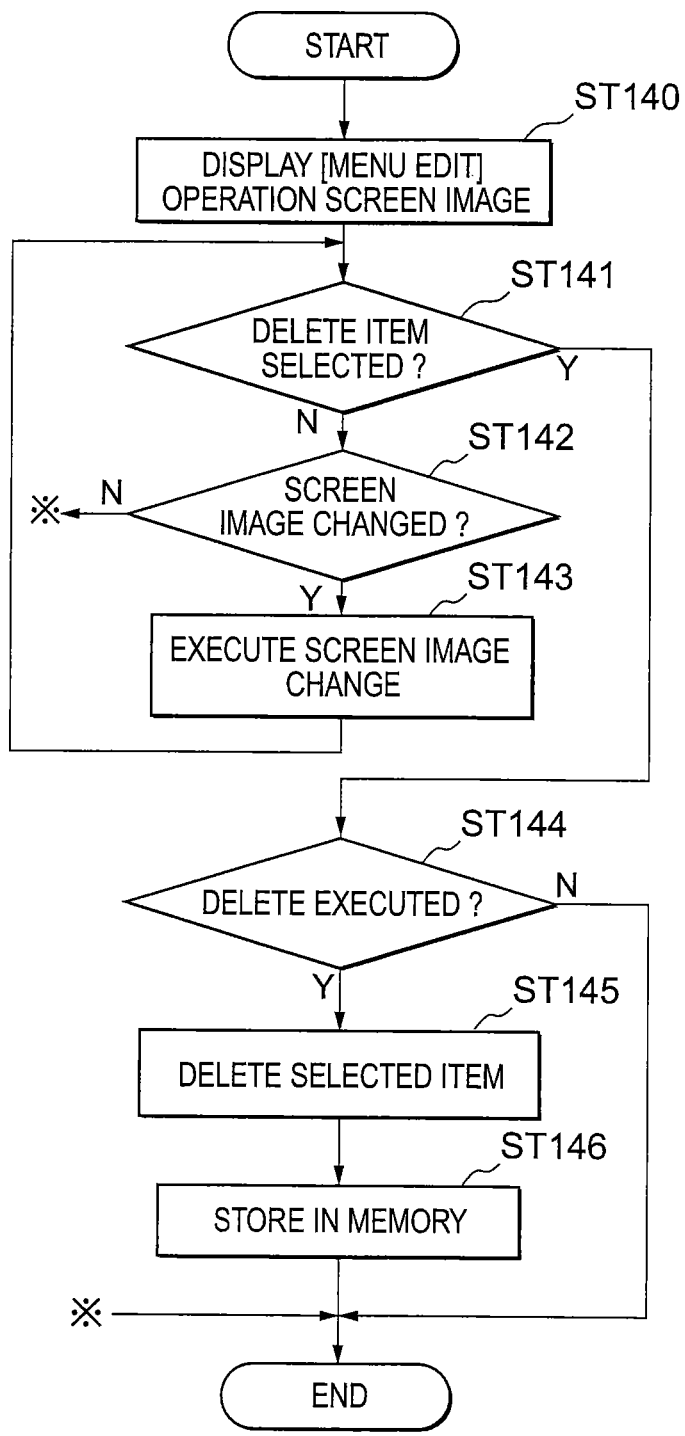
FIG. 7 is a flowchart of a [deleting] operation when a [Delete] button is operated on the GUI screen image shown in FIG. 5.

(B) Operation for a case where the [Set Item] button on the [Personal Menu] is [Deleted] will be explained with reference to a flowchart of FIG. 7.

When a [Delete] button is selected from the edition button group 15A on the GUI screen image 100A of FIG. 5, the operating section 130 or the GUI section 125 sends out a predetermined control signal to the system microcomputer 140, and the system microcomputer 140 controls the image display device 150 so as to display the GUI screen image (refer to FIG. 4) to delete the [Set Item] button from the [Personal Menu] on the display 120 (ST140).

Then, in a case where the [Set Item] button that is desired to be deleted exists in the [Set Item] button group 10 displayed on the GUI screen image when the operating section 130 is operated or the LCD panel is touched, the operating section 130 is operated or the LCD panel is touched to select the corresponding [Set Item] button (ST141).

On the other hand, in a case where the [Set Item] button that is desired to be deleted does not exist in the [Set Item] button group 10, when the [Alter] button 11 is selected and operated, the system microcomputer 140 generates the GUI screen image 100 composed of another [Set Item] button group 10 stored in the storing section (memories) so as to display it on the display 120 (ST141->ST142->ST143->ST141).

When the [Set Item] button that is desired to be deleted is selected, the operating section 130 or the GUI section 125 sends out a predetermined control signal to the system microcomputer 140, and the system microcomputer 140 controls the image display device 150 in response to this control signal, and displays a confirmation message as to whether or not the deletion is executed on the display 120 (ST141-> ST144).

When the [Delete] operation is executed, the system microcomputer 140 reads out the unique menu information stored in the storing section (memories), and deletes the information (data) corresponding to the relevant [Set Item] button, and then writes the unique menu information, from which the relevant information (data) is deleted, to the storing section (memories) (ST144->ST145, ST146).

When the [Delete] operation is not executed, the process returns back to a predetermined GUI screen image and ends (ST144->End).

Figure 8:
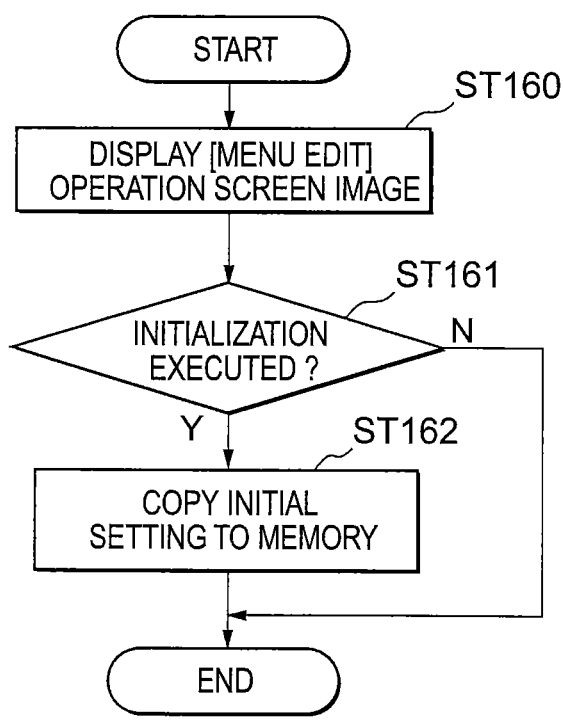
FIG. 8 is a flowchart of an [initializing] operation when an [Initialize] button is operated on the GUI screen image shown in FIG. 5.

(C) Operation for a case where the [Personal Menu] is [Initialized] will be explained with reference to a flowchart of FIG. 8.

When an [Initialize] button is selected from the edition button group 15A on the GUI screen image 100A of FIG. 5, the operating section 130 or the GUI section 125 sends out a predetermined control signal to the system microcomputer 140, and the system microcomputer 140 controls the image display device 150 to display a confirmation message as to whether or not the initialization of the [Personal Menu] is executed on the display 120 (ST160, ST161).

In a case where the [Initialize] operation is executed, the system microcomputer 140 executes an initializing process such as writing (copying) default menu information to the storing section (memories), erasing the unique menu information, or the like (ST161->ST162).

In a case where the [Initialize] process is not executed, the process returns back to the predetermined GUI screen image and ends (ST161->End).

(D) Operation for a case where the [Set Item] buttons of the [Personal Menu] are [Rearranged] will be explained with reference to a flowchart of FIG. 9.

Figure 10A:
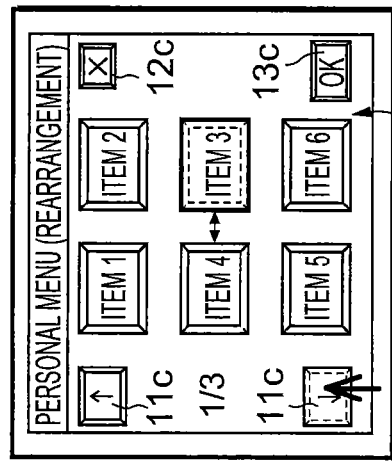
FIG. 10A to FIG. 10E are explanation views for explaining the GUI screen image displayed in accordance with the flowchart of FIG. 9.

When the [Rearrange] button is selected from the edition button group 15A on the GUI screen image 100A of FIG. 5, the operating section 130 or the GUI section 125 sends out a predetermined control signal to the system microcomputer 140, and the system microcomputer 140 controls the image display device 150 so as to display a GUI screen image 100B for rearranging the [Set Item] buttons for the [Personal Menu] as shown in FIG. 10A on the display 120 (ST180).

And, in a case where a [Set Item] button that is desired to be moved exists in the [Set Item] button group displayed on the GUI screen image 100B by operating the operating section 130 or touching the LCD panel, the operating section 130 is operated or the LCD panel is touched to select the relevant [Set Item] button (ST181).

On the other hand, in a case where the [Set Item] button that is desired to be moved does not exist in the [Set Item] button group 10, when the [Alter] button (refer to FIG. 4) is selected and operated, the system microcomputer 140 generates a GUI screen image 100B' composed of another [Set Item] button group 10' stored in the storing section (memories) to display it on the display 120 (ST181->ST182->ST183->ST181).

And, when the [Set Item] button that is desired to be moved is selected, the operating section 130 or the GUI section 125 sends out a predetermined control signal to the system microcomputer 140, and the system microcomputer 140 controls the image display device 150 in response to this control signal and changes the display state of the target button, and also displays a GUI screen image 100C to rearrange the [Set Item] buttons for the [Personal Menu] on the display 120 (ST181-> ST184).

Figure 10B:
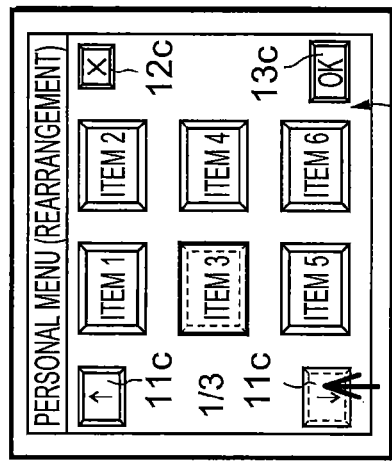

In this case, it is supposed that an [Item 3] button shown in FIG. 10B is selected.

Next, when the operating section 130 is operated or the LCD panel is touched to designate a move position of the selected button on the GUI screen image 100C, the system microcomputer 140 controls the image display device 150 so as to display a GUI screen image 100D in a condition that the button at the designated position is exchanged with the target button on the display 120 (ST185, ST186).

Figure 10C:
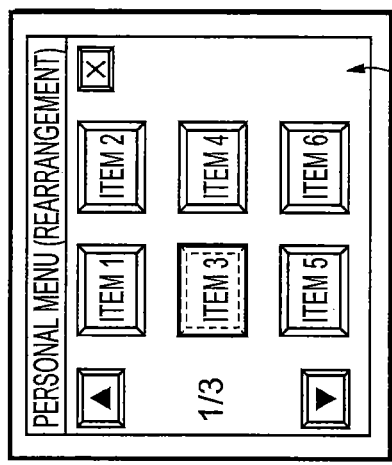

Here, when a position of an [Item 4] button is designated, as shown in FIG. 10C, the GUI screen image 100D in which the displayed positions of the target [Item 3] button and [Item 4] button that are exchanged is displayed on the display 120.

Next, it is selected whether or not the moving operation is to be continued (ST187).

Here, in a case where the moving operation is to be continued, the [Set Item] button that is desired to be moved is again set on the GUI screen image 100D, and the above-mentioned operations are repeated (ST187-> ST181-> ... ).

Figure 10D:
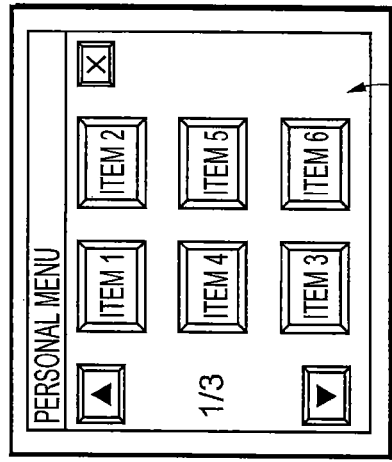

For example, as shown in FIG. 10D, in a case where the [Item 3] button is to be successively moved, when the [Item 3] that is the target button is selected and a position of an [Item 5] button is designated as a move destination position, a GUI screen image 100E in which the displayed positions of the [Item 3] and [Item 5] buttons are exchanged is displayed on the display 120.

And, when the move of the button is ended, namely, when the position of the [Set Item] button is fixed, an [OK] button 13c on the GUI screen image is operated (ST187->ST188).

The operating section 130 or the GUI section 125 sends out a predetermined control signal to the system microcomputer 140 when the [OK] button 13c is operated, and the system microcomputer 140 stores position information of the [Set Item] button group 10 in the current GUI screen image in the storing section (memories) in response to this control signal (ST189).

Figure 10E:
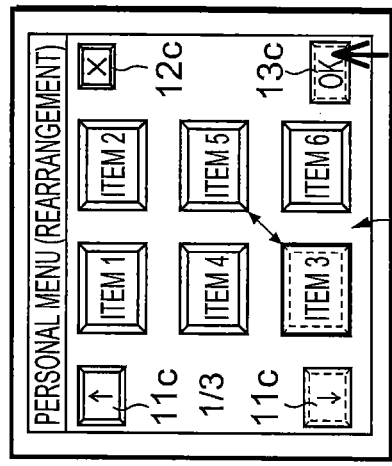

Then, the system microcomputer 140 controls the image display device 150 to display a GUI screen image 100' of the [Personal Menu], in which the [Set Item] button group 10 is newly rearranged on the display 120 as shown in FIG. 10E.

[2]: Layout of Menu Information on GUI Screen Image

Figure 11:
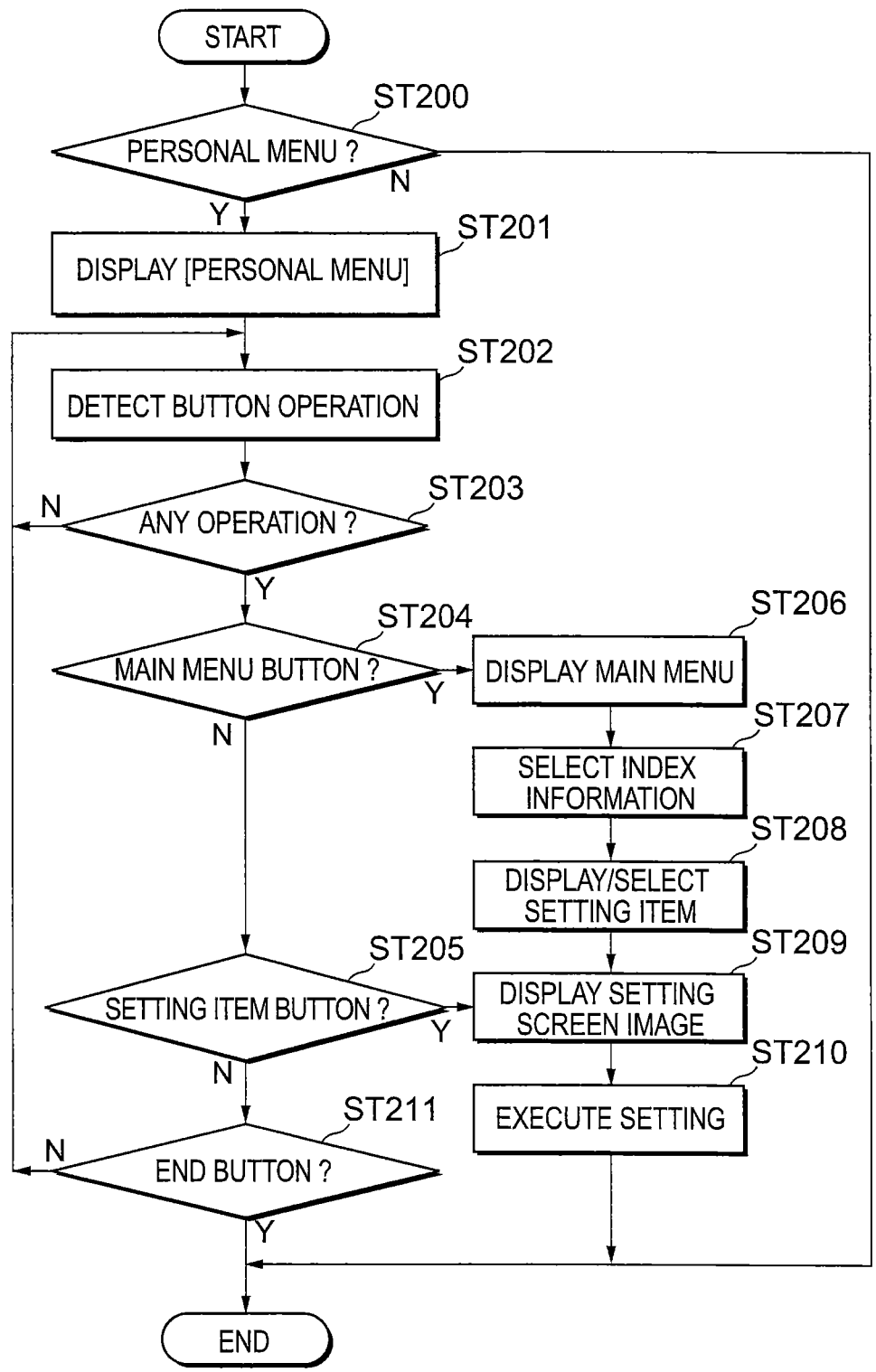
FIG. 11 is a flowchart showing operation steps when setting is carried out through the [Personal Menu] in the imaging apparatus shown in FIG. 2.

Next, layout of the menu information on the GUI screen image and operation thereof will be described with reference to a flowchart of FIG. 11.

When the operating section 130 is operated or the LCD panel is touched to select the [Personal Menu] from the icon or menu information displayed on the display 120, the operating section 130 or the GUI section 125 sends out a predetermined control signal to the system microcomputer 140.

The [Personal Menu] is the unique menu information which the user generates by individually selecting frequently used setting items among the setting items for setting the function of the imaging apparatus.

The system microcomputer 140 judges whether or not the [Personal Menu] is selected on the basis of the control signal from the operating section 130 or the GUI section 125 (ST200).

In a case where the [Personal Menu] is not selected, the process and operation which are related to the [Personal Menu] are not carried out, and the process ends (ST200-> End).

In a case where the [Personal Menu] is selected, the system microcomputer 140 controls the image display device 150 in response to the control signal from the operating section 130 or the GUI section 125, and generates the GUI screen image 100 (refer to FIG. 4) for the [Personal Menu], in accordance with the unique menu information stored in the storing section (memories) and its image data, to display it on the display 120 (ST200->ST201).

Figure 12:
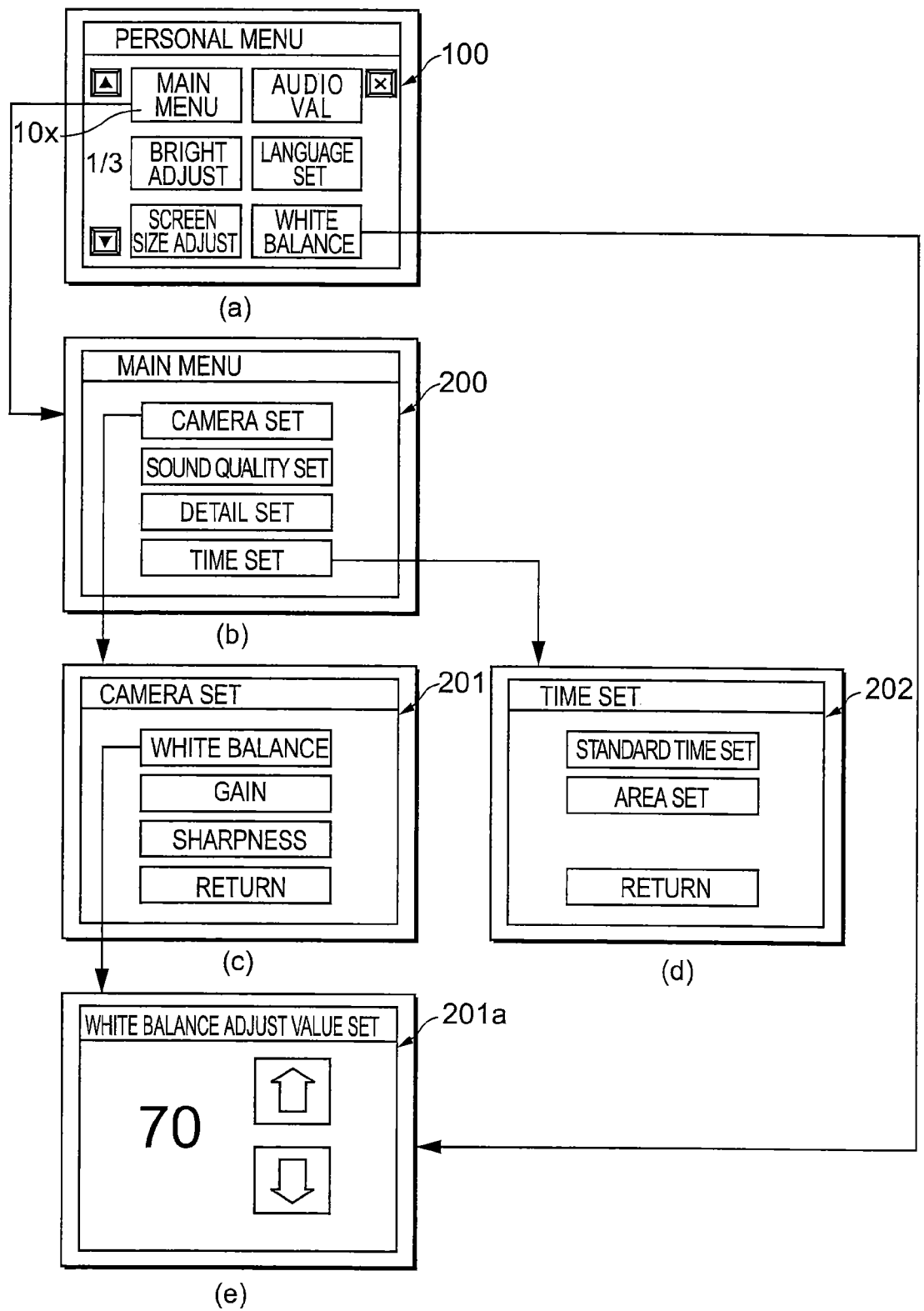
FIG. 12 is an explanation view for explaining the GUI screen image displayed in accordance with the flowchart of FIG. 11.

For example, as shown in FIG. 12($a$), the [Set Item] button group 10 on the GUI screen image 100 is provided with [Set Item] buttons such as [Bright Adjust], [Image Size Adjust], [AUDIOVAL], [Language Set], [White Balance] and the like, as well as a [Main Menu] button 10$x$ to call for

[Main Menu] which is default-displayed when the power switch 170 of the imaging apparatus is turned on, and the like.

When the GUI screen image 100 is displayed, the system microcomputer 140 goes into a state to detect whether or not the operation of the [Set Item] button is carried out (ST202).

And, when the operating section 130 is operated or the LCD panel is touched to select a button on the GUI screen image 100, the operating section 130 or the GUI section 125 sends out a predetermined control signal to the system microcomputer 140 (ST202->ST203).

Upon detecting the predetermined control signal from the operating section 130 or the GUI section 125, the system microcomputer 140 judges whether or not the [Main Menu] button 10x is operated (ST204).

In a case where the [Main Menu] button 10x is not operated, the system microcomputer 140 controls the image display device 150 in response to the control signal from the operating section 130 or the GUI section 125 to display the GUI screen image corresponding to the selected [Set Item] button on the display 120 (ST204->ST205).

For example, if the [White Balance] button is selected in FIG. 12(a), the system microcomputer 140 controls the image display device 150 in response to the control signal from the operating section 130 or the GUI section 125, and generates a GUI screen image 201a for setting [White Balance] as shown in FIG. 12(e) to display it on the display 120 (ST205->ST209).

And, the user operates the operating section 130 or touches the LCD panel to execute the setting operation, in accordance with the GUI screen image 201a displayed on the display 120 (ST210).

On the other hand, in a case where the [Main Menu] button 10x is operated, the system microcomputer 140 controls the image display device 150 in response to the control signal from the operating section 130 or the GUI section 125, and generates a GUI screen image 200 of the [Main Menu] to display it on the display 120 (ST204->ST206).

On the GUI screen image 200, a list of the index information in which all of the setting items of the imaging apparatus are classified with a major division is displayed, for example, as shown in FIG. 12(b).

Then, the operating section 130 is operated or the LCD panel is touched in order to select the index information including desired setting item among the index information displayed on the GUI screen image 200 (ST207).

The system microcomputer 140 controls the image display device 150 in response to the control signal from the operating section 130 or the GUI section 125, and generates the GUI screen image for selecting the setting item corresponding to the selected index information to display it on the display 120 (ST208).

For example, when the index information for [Camera Setting] on the GUI screen image 200 shown in FIG. 12(b) is selected, a GUI screen image 201 composed of [Set Item] buttons such as settable items [White Balance], [Gain], [Sharpness] and the like is displayed as shown in FIG. 12(c). When the index information of [Time Setting] is selected, a GUI screen image 202 including [Set Item] buttons such as setting items [Standard Time Setting], [Area Setting] and the like is displayed as shown in FIG. 12(d).

And, when the operating section 130 is operated or the LCD panel is touched to select the desired [Set Item] button on this GUI screen image 201 or 202, the operating section 130 or the GUI section 125 sends a predetermined control signal to the system microcomputer 140 (ST208).

Here, the [White Balance] button on the GUI screen image 201 shown in FIG. 12(c) is selected.

The system microcomputer 140 controls the image display device 150 in response to the control signal from the operating section 130 or the GUI section 125, and generates a GUI screen image 201a for setting the selected [White Balance] to display it on the display 120 (ST209).

The user operates the operating section 130 or touches the LCD panel in accordance with the GUI screen image 201a displayed on the display 120, and executes the setting operation of the [White Balance] (ST210).

Furthermore, when the [End] button is operated on each GUI screen image, the system microcomputer 140 controls the image display device 150 in response to a control signal from the operating section 130 or the GUI section 125, and closes the display on the GUI screen image 100 for the [Personal Menu] (ST204->ST205->ST211->End).

In this way, the [Main Menu] button 10x is configured to be included in the [Set Item] button group 10 on the GUI screen image 100 for the [Personal Menu]. Thus, it is possible to immediately shift from the GUI screen image for the [Personal Menu] to the GUI screen image for the [Main Menu].

[3]: Scroll-Display of Menu Item

Figure 13:
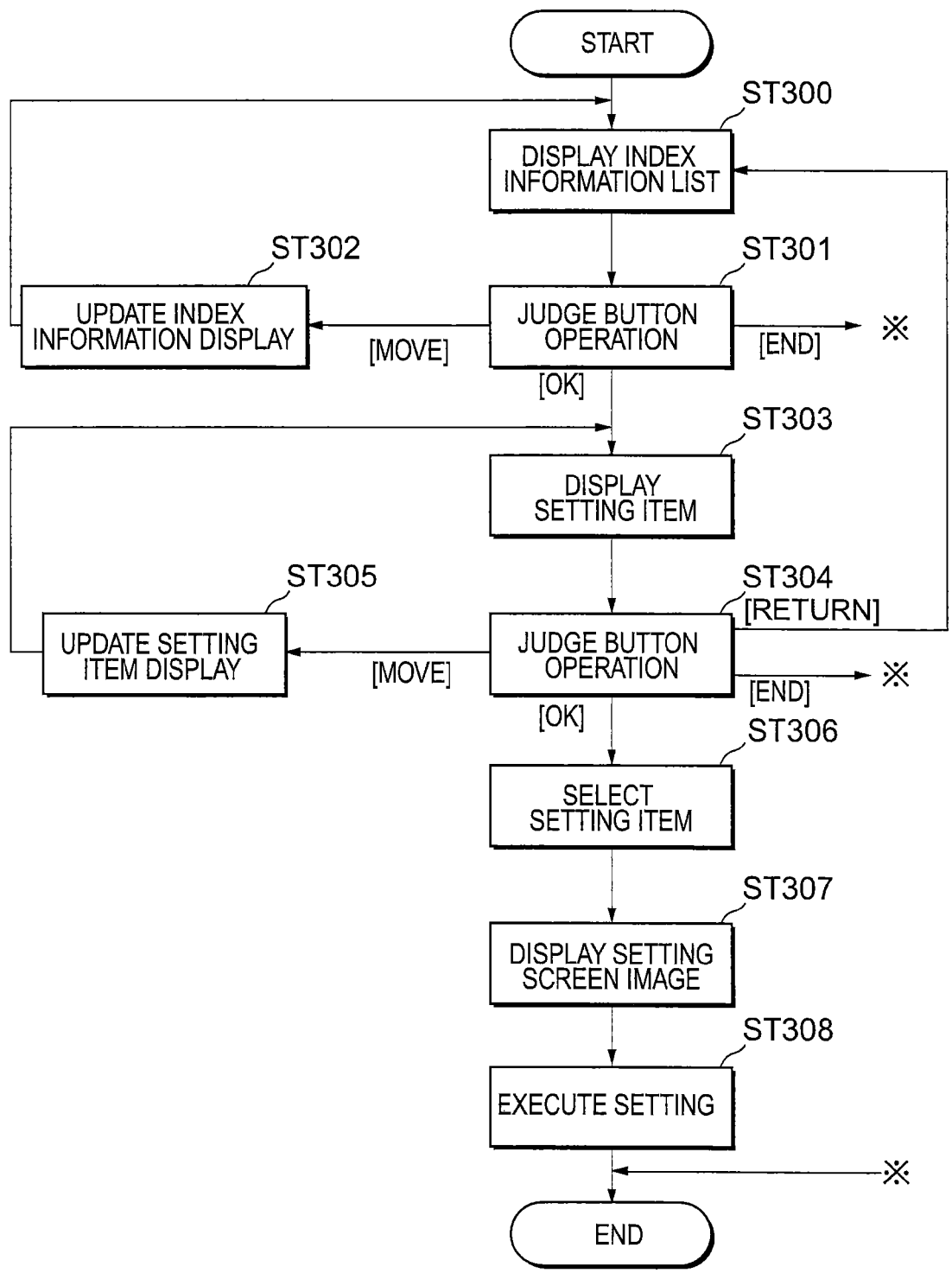
FIG. 13 is a flowchart showing operation steps until the selection of the setting item through the [Main Menu] in the imaging apparatus shown in FIG. 2.

The GUI screen image at the time of the selection and operation based on the menu information will be described below with reference to a flowchart of FIG. 13.

At first, when the operating section 130 is operated or the LCD panel is touched to select the [Main Menu] to look though the index information in which the setting items of the imaging apparatus are classified in major division, the operating section 130 or the GUI section 125 sends out a predetermined control signal to the system microcomputer 140.

The system microcomputer 140 controls the image display device 150 in response to the control signal from the operating section 130 or the GUI section 125 to display the GUI screen image 200 displaying a list of the index information on the display 120 (ST300).

Figure 14A:
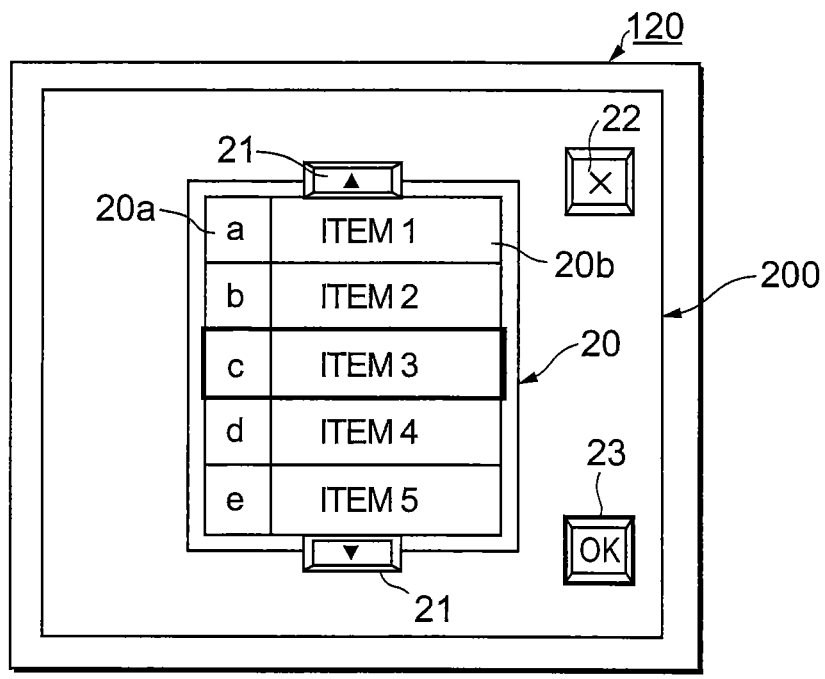
FIG. 14A to FIG. 14B are explanation views for explaining the GUI screen image displayed in the operation steps of the flowchart in FIG. 13.

For example, as shown in FIG. 14A, the GUI screen image 200 is composed of an index display section 20 for displaying the list of the index information in which the setting items of the imaging apparatus are classified in major division; a [Move] button 21 for scrolling and selecting the index information displayed on the index display section 20; an [End] button 22 for closing the GUI screen image 200; an [OK] button 23 for determining the selection of the index information; and the like.

Additionally, each index information displayed on the index display section 20 is composed of a symbol 20a designed for representing the index information, and a character information 20b for explaining the index information.

And, when the operating section 130 is operated or the LCD panel is touched to operate the [Move] button 21 on the GUI screen image 200, the index information displayed on the index display section 20 is scrolled to change the displayed condition of the index information currently being selected (ST301->ST302->ST300).

When the [End] button 22 is operated, the process returns back to the screen image before the [Index Displaying] selection (ST301->End).

On the other hand, for example, as shown in FIG. 14A, when index information [Item 3] is selected by operating the [OK] button 23, the operating section 130 or the GUI section 125 sends out a predetermined control signal to the system microcomputer 140.

The system microcomputer 140 controls the image display device 150 in response to the control signal from the operating section 130 or the GUI section 125, and generates a GUI screen image 300 for the selection and operation of the setting item, on the basis of the information of the setting item corresponding to the index information [Item 3], to display it on the display 120 (ST301->ST303).

Figure 14B:
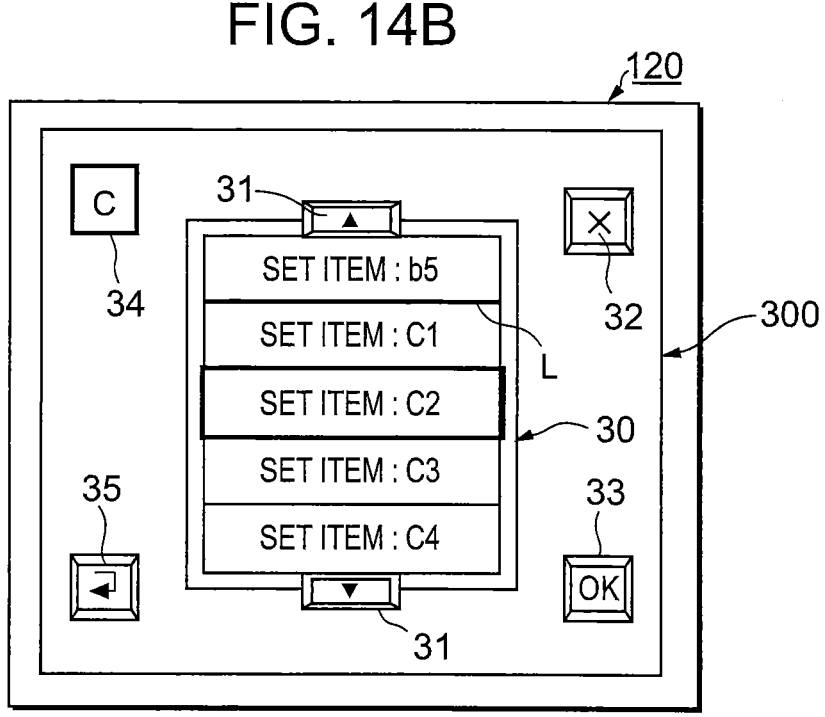

For example, as shown in FIG. 14B, the GUI screen image 300 is provided with a setting item display section 30 for displaying a list of the setting items, a [Move] button 31 for scrolling and selecting the setting item displayed on the setting item display section 30, an [End] button 32 for closing the GUI screen image 300, an [OK] button 33 for determining the selection of the setting item, a symbol display section 34 for displaying the symbol 20a corresponding to the index information, a [Return] button 35 for returning to the GUI screen image 200 (the [Main Menu] screen image), and the like.

The setting item display section 30 displays the setting item corresponding to the adjacent index information in the index display section 20 (refer to FIG. 14A) on the GUI screen image 300 on the basis of the number of the setting items to be displayed, and a boundary line L indicating its boundary.

In FIG. 14B, on the setting item display section 30, setting items [c1] to [c4] corresponding to the index information [Item 3] are displayed, and a setting item [b5] corresponding to index information [Item 2] adjacent on the GUI screen image 200 is displayed, and the boundary line L is displayed on the boundary section between the setting item [c1] and the setting item [b5].

And, when the operating section 130 is operated or the LCD panel is touched to operate the [Move] button 31 on the GUI screen image 300, the setting item displayed on the setting item display section 30 is scrolled to change the displayed condition of the setting item currently being selected (ST303->ST1304->ST1305->ST303).

When the [Move] button 31 is operated beyond the boundary line L, the setting item of the adjacent index information is seamlessly displayed.

For example, when the move button 31 is operated to scroll the setting item, the setting item display section 30 is changed to the displaying condition of FIG. 15B from that of FIG. 15A, and the setting item [c1] corresponding to the index information [Item 3] and the setting items [b2] to [b5] corresponding to the index information [Item 2] are displayed. A symbol [b] of the index information [Item 2] is displayed on the symbol display section 34.

In this way, the boundary line L is displayed on the boundary between the adjacent index information on the GUI screen image 300, and the setting items are seamlessly displayed. Thus, even if it does not return back to the GUI screen image 200 on which the list of the index information is displayed, all of the setting items can be confirmed and set. That is, the setting items corresponding to the respective index information are all placed in the continuously listing manner, and they can be continuously displayed.

In this case, when the [OK] button 33 is operated on the GUI screen image 300, the operating section 130 or the GUI section 125 sends out a predetermined control signal to the system microcomputer 140 (ST303->ST304->ST306).

The system microcomputer 140 controls the image display device 150 in response to the control signal from the operating section 130 or the GUI section 125, and displays the setting screen image corresponding to the setting item, in which the displayed condition in the setting item display section 30 is changed, on the display 120 (ST306->ST307).

The user operates the operating section 130, or touches the LCD panel to execute the setting operation in accordance with the setting screen image (refer to FIG. 12(e)) displayed on the display 120 (ST308).

On the other hand, when the [Return] button 35 is operated on the GUI screen image 300, the screen image returns back to the GUI screen image 200 in the condition that the index information [Item 2] is selected (ST303->ST304->ST300).

It is noted that, as shown in FIG. 16(a), in a state where the index information [Item 3] is selected on the GUI screen image 200 to shift to the GUI screen image 300, and the setting item is scrolled to go beyond the boundary line L on the GUI screen image 300, that is, for example, a state where the setting item corresponding to the index information [Item 2] on the GUI screen image 200 is displayed, when the [Return] button 35 is operated, the screen image returns back to the GUI screen image 200 in the condition that the index information [Item 2] is selected as shown in FIG. 16(b).

In addition, when the [End] button 32 is operated on the GUI screen image 300, the screen image returns back to the screen image condition before selecting the [Main Menu] (ST303->ST304->End).

[4]: GUI Display of Selection/Determination of Operation

Next, the GUI screen image at the time of selecting or determining the function of the apparatus will be described with reference to FIG. 17A to FIG. 17C.

On the GUI screen image on which the menu information is displayed, when the operating section 130 is operated or the LCD panel is touched to select the [Set Item] button, a predetermined control signal is sent from the operating section 130 or the GUI section 125 to the system microcomputer 140.

The system microcomputer 140 controls the image display device 150 in response to the control signal from the operating section 130 or the GUI section 125, and displays a function setting screen image, a GUI screen image 400, corresponding to the [Set Item] button on the display 120.

Figure 17A:
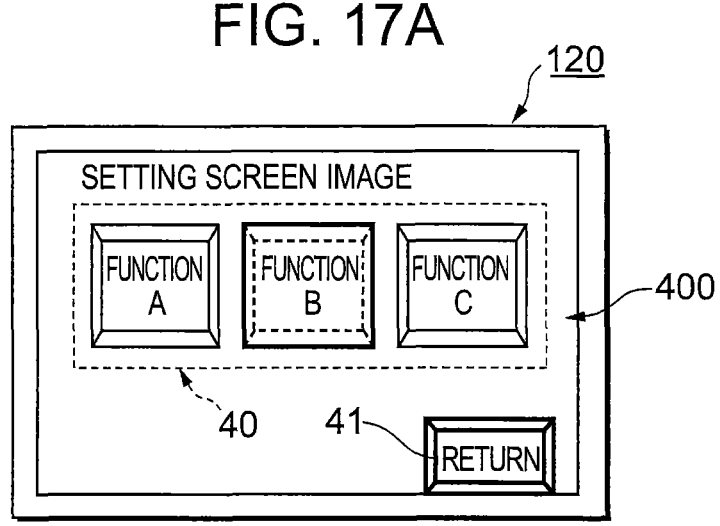
FIG. 17A to FIG. 17C are explanation views for explaining the GUI screen image displayed when the operation is selected or determined in the imaging apparatus according to the present invention.
Figure 17B:
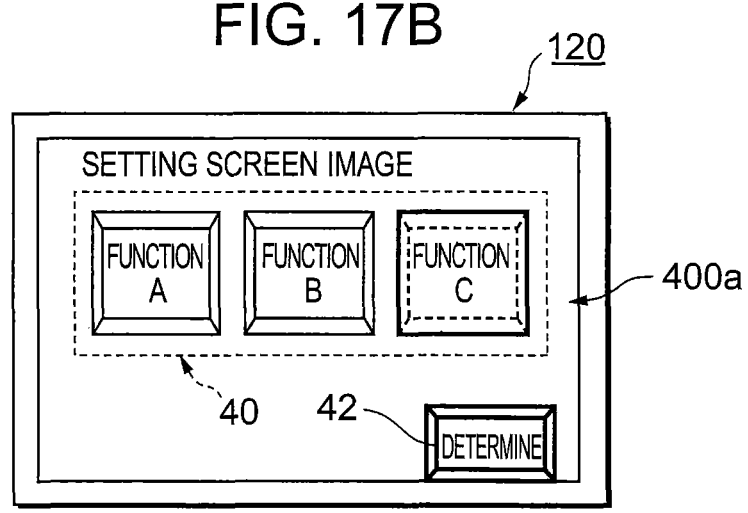

For example, the GUI screen image 400 displays a GUI screen image composed of a setting button group 40 for setting functions A to C, and a [Return] button 41 for returning back to the previous displayed screen image before the GUI screen image 400, as shown in FIG. 17A.

At this time, the setting button of the currently set function, for example, [Function B] is displayed in a condition different from the other setting buttons, and the fact that it is set is clearly indicated.

In a case where the current setting may be maintained on the GUI screen image 400, when the operating section 130 is operated or the LCD panel is touched to select the [Return] button 41, a predetermined control signal is sent from the operating section 130 or the GUI section 125 to the system microcomputer 140. The system microcomputer 140 controls the image display device 150 in response to the control signal from the operating section 130 or the GUI section 125, and displays the displayed screen image before the GUI screen image 400 on the display 120.

On the other hand, when the setting is changed to another function, the operating section 130 is operated or the LCD panel is touched to select another setting button such as the setting button for the [Function C] of FIG. 17A, for example, among the setting button group 40.

When the setting button of the [Function C] is selected, a predetermined control signal is sent from the operating section 130 or the GUI section 125 to the system microcomputer 140. The system microcomputer 140 controls the image display device 150 in response to the control signal from the operating section 130 or the GUI section 125, and changes the displayed condition of the setting button of the [Function C] to clearly indicate that it is selected, as in the GUI screen image 400a shown in FIG. 17B, and also changes the GUI display image of the [Return] button 41 to the GUI display image of a [Determine] button 42.

The [Determine] button 42 on a GUI screen image 400a is displayed only in a case where the current setting is changed. It is designed such that unless the setting of the changed function is [Determined], it is not possible to shift to a screen image other than the GUI screen image 400a. For this reason, the fact that the setting is changed can be obviously judged.

When the [Determine] button 42 is operated, the operating section 130 or the GUI section 125 sends a predetermined control signal to the system microcomputer 140, and the system microcomputer 140 changes the function currently set, in accordance with the control signal from the operating section 130 or the GUI section 125, and stores it in the storing section (memories).

In a case where another setting button is erroneously operated or where the setting change is stopped, the setting button of the [Function B] before the change is selected on a GUI screen image 400b.

Figure 17C:
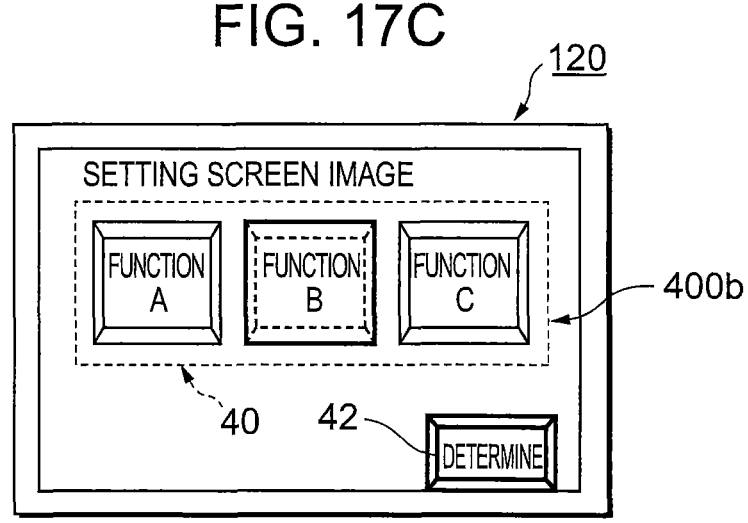

When the setting button of the [Function B] is selected, the operating section 130 or the GUI section 125 sends a predetermined control signal to the system microcomputer 140, and the system microcomputer 140 controls the image display device 150 in response to the control signal from the operating section 130 or the GUI section 125, and changes the displayed condition of the setting button of the [Function B] as shown on the GUI screen image 400b of FIG. 17C to clearly indicate the fact that it is selected.

When the operating section 130 is operated or the LCD panel is touched to operate the [Determine] button 42 on the GUI screen image 400b, the operating section 130 or the GUI section 125 sends a predetermined control signal to the system microcomputer 140, and the system microcomputer 140 maintains the setting stored in the storing section (memories) to be the condition before changing where the [Function B] is set, in response to the control signal from the operating section 130 or the GUI section 125, controls the image display device 150, and then closes the GUI screen image 400b.

Alternatively, when the operating section 130 is operated or the LCD panel is touched to operate the [Determine] button 42 on the GUI screen image 400b, the state shown in FIG. 17A, namely, the GUI screen image 400 is displayed. By selecting the [Return] button 41 on the GUI screen image 400, the GUI screen image 400 may be closed.

In this way, while the operation is not performed on the GUI screen image, the [Return] button is displayed, and when the operation has been carried out, it is switched to the [Determine] button to determine its operation. Thus, it can be made clear whether or not the operation is performed on the GUI screen image currently being displayed.

It is obvious that the buttons displayed on the GUI screen image are not limited to the [Return] button and the [Determine] button.

[5]: Setting Screen of Numeric Data

The GUI screen image at the time of setting numeric data will be described below with reference to a flowchart of FIG. 18. Here, the setting screen image in a case of setting a time interval of an intermittent recording is explained as an example.

At first, when the operating section 130 is operated or the LCD panel is touched to select a desired setting item from the icon and menu information displayed on the display 120, the operating section 130 or the GUI section 125 sends a predetermined control signal to the system microcomputer 140.

Here, a setting item button of [Wait Time] for setting the time interval of intermittent recording is selected, and a predetermined control signal corresponding to the setting item button of this [Wait Time] is sent to the system microcomputer 140.

The system microcomputer 140 controls the image display device 150 in response to the control signal from the operating section 130 or the GUI section 125, reads out the setting information and screen image data of the currently set [Wait Time] from the storing section, and generates a GUI screen image 500, which is the setting screen image for setting the [Wait Time] to display it on the display 120 (ST500).

Figure 19:
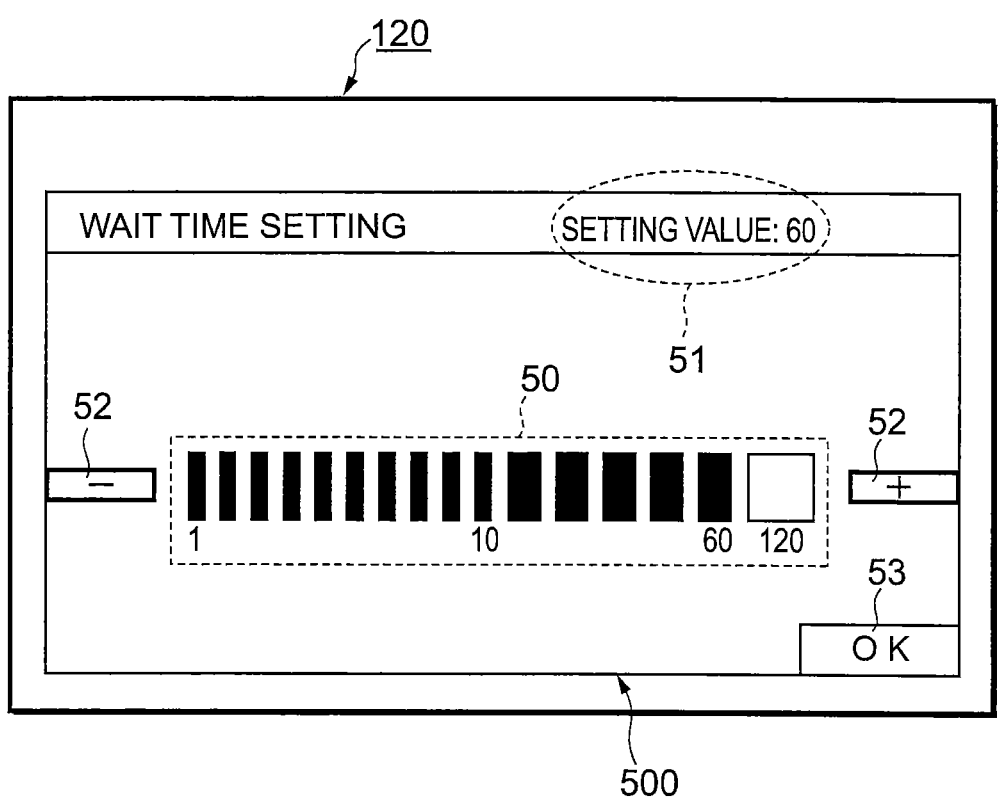
FIG. 19 is an explanation view for explaining the GUI screen image displayed in accordance with the flow chart of FIG. 18.

For example, as shown in FIG. 19, a GUI screen image 500 for [Wait Time Setting] is composed of a setting range display section 50 for graphically displaying a range of setting values and a current setting value, a setting value display section 51 for character-displaying the setting value based on the graphic display of the setting range display section 50, operation buttons 52 (a [−] button and a [+] button) for changing (increase or decrease) the setting value, an [OK] button 53 for determining the setting value, and the like.

It is noted that the graphic information graphically displayed on the setting range display section 50 is stored in the storing section (memories) of the system microcomputer 140 as data which is obtained by preliminarily dividing the values of the settable range into a plurality of ranges so as to be set easily, defining as the predetermined set time interval based on the divided respective ranges, and changing a shape of graphic in accordance with the divided and set respective time intervals.

For example, as shown in FIG. 19, the setting value of the wait time can be set in the range between 1 and 120 on the GUI screen image 500. The setting interval from 1 to 10 is assumed to be [1], the setting interval from 10 to 60 is assumed to be [10], and the setting interval of from 60 to 120 is assumed to be [60]. The width of a bar-shaped graphic is changed on the basis of each setting interval that is divided and set in this way.

And, when the GUI screen image 500 is displayed on the display 120, the process comes into a standby state for detecting a button operation (ST510).

Here, in a case of changing the setting value, when the operating section 130 is selected or the LCD panel is touched to operate the operation button 52 and the [OK] button 53, the operating section 130 or the GUI section 125 sends a control signal corresponding to the operated button to the system microcomputer 140.

On detection of the control signal from the operating section 130 or the GUI section 125, the system microcomputer 140 judges which button was operated (ST520).

In a case where the [−] button is operated, the system microcomputer 140 controls the image display device 150 to change the display condition of the [−] button so as to clearly indicate that the [−] button was operated, and also carries out a process for subtracting a value corresponding to the graphic displaying on the setting range display section 50, namely, a predetermined value corresponding to a preset setting interval, in accordance with the number of the operations of the [−] button, from the current setting value stored in the storing section (memories) (ST520->ST521, ST522).

Then, on the basis of the setting value obtained through the subtracting process, the display of the graphic information graphically displayed on the setting range display section 50 and the character information of the setting value display section 51 are updated (ST522->ST540).

In a case where not the [−] button but the [+] button is operated, the system microcomputer 140 controls the image display device 150 to change the display condition of the [+] button to clearly indicate that the [+] button was operated, and also carries out a process for adding a value corresponding to the graphic display on the setting range display section 50, namely, a predetermined value corresponding to the preset setting interval, in accordance with the number of the operations of the [+] button, to the current setting value stored in the storing section (memories) (ST520->ST530->ST531, ST532).

Then, on the basis of the setting value obtained through the adding process, the displaying of the graphic information graphically displayed on the setting range display section 50 and the character information of the setting value display section 51 are updated (ST532->ST540).

In a case where neither the [−] button nor the [+] button are operated but the [OK] button 53 is, the setting value currently being displayed on the GUI screen image 500 is stored in the storing section (memories) (ST520->ST530->ST550-> ST560).

As described above, by diving the setting range of the setting values into the plurality of ranges, setting the setting intervals corresponding to the divided respective ranges and then changing the shape of the graphic to be displayed on the basis of this setting interval, the range of the setting values corresponding to the respective setting items can be viewed efficiently and intuitively.

[6]: Layout Display of Icon and Character Information

Figure 20:
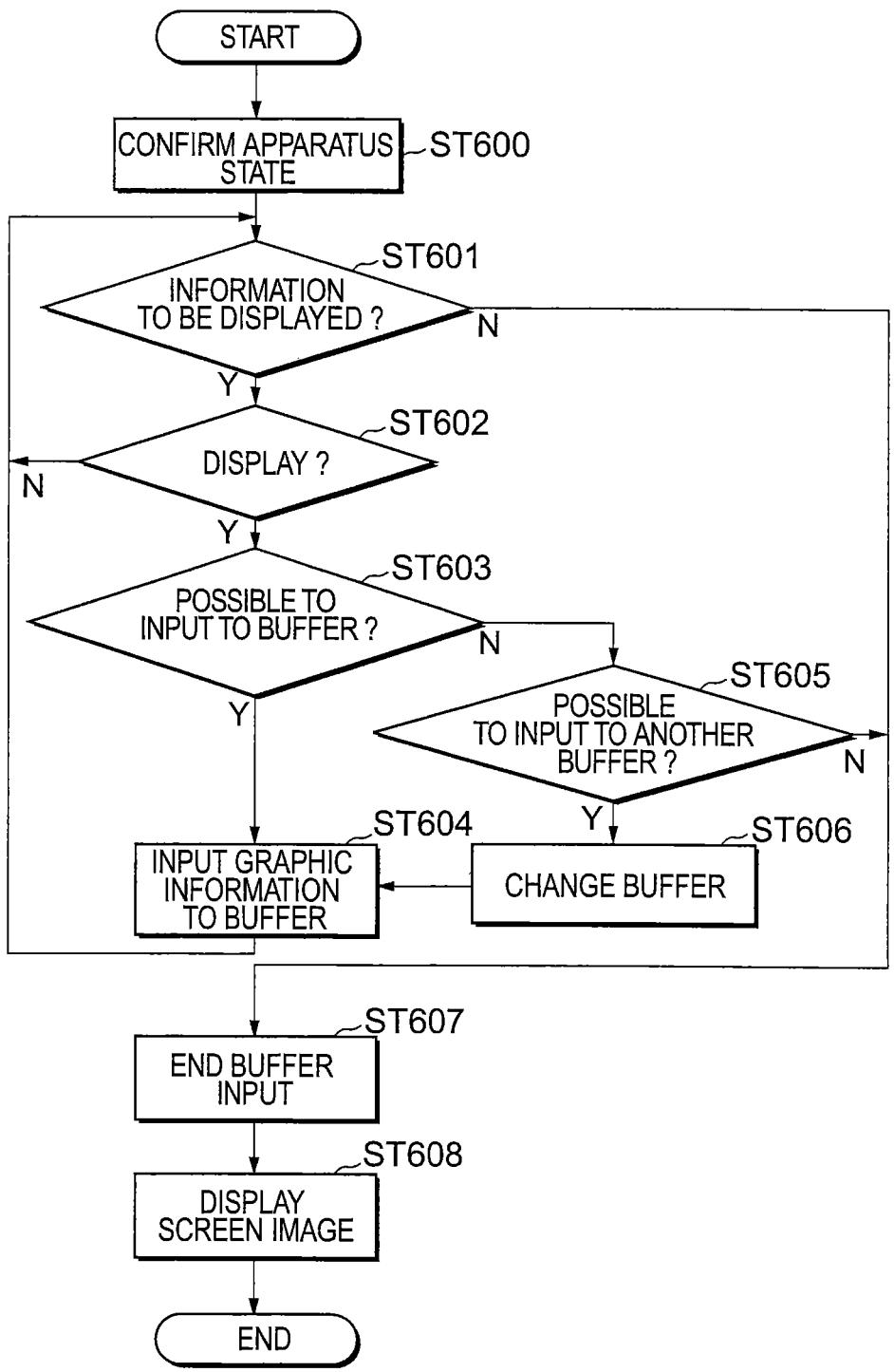
FIG. 20 is a flowchart showing the operation steps when graphic information, such as character information, icon and the like, is displayed in the imaging apparatus shown in FIG. 2.

Operation at the time of displaying the graphic information of the apparatus condition (the setting state or the like) on the screen by the icon, the character information or the like will be described below with reference to a flowchart of FIG. 20.

For example, when the operating section 130 is operated or the LCD panel is touched to carry out the operation for displaying a certain apparatus condition (a setting state or the like) from the icon or menu information displayed on the display 120, the operating section 130 or the GUI section 125 sends a predetermined control signal to the system microcomputer 140.

The system microcomputer 140 confirms the apparatus condition (the setting state or the like) in accordance with the order (priority) defined in a table data in the storing section (memories) upon receiving this control signal (ST600).

Then, the system microcomputer 140 determines whether or not the graphic information corresponding to the confirmed apparatus condition should be displayed on the screen (ST601).

In a case where there is no graphic information to be displayed, the process is ended (ST601->End).

In a case where there is the graphic information to be displayed, it is judged whether or not this graphic information should be displayed (ST601->ST602).

In a case where the graphic information is not to be displayed, a process for judging whether or not the apparatus condition to be confirmed next is the graphic information to be displayed is performed (ST602->ST601).

In a case where the graphic information is to be displayed, it is judged whether or not the graphic information can be inputted to a buffer of the image display device 150 (ST602-> ST603).

In a case where the graphic information can be inputted to the buffer, the graphic information is read out from the storing section (memories) of the system memory 140, and the read out graphic information is inputted to the buffer of the image display device 150 (ST603->ST604).

Then, when the graphic information is inputted to the buffer of the image display device 150, in accordance with the order (priority) defined in the table data, a similar judging process is repeated for the apparatus condition to be confirmed next (ST604->ST601-> . . . ).

In a case where the graphic information can not be inputted to the buffer of the image display device 150, it is judged whether or not it can be inputted to a different buffer (ST603->ST605).

In a case where the graphic information can be inputted to the different buffer, it is read out from the storing section (memories) of the system memory 140, and the read out graphic information is inputted to the different buffer of the image display device 150 (ST605->ST606->ST604).

When the graphic information is inputted to the different buffer of the image display device 150, in accordance with the order (priority) defined in the table data, a similar judging process is repeated for the apparatus condition to be confirmed next (ST604->ST601-> . . . ).

On the other hand, in a case of the condition that the graphic information cannot be inputted to the different buffer, or the condition that there is no graphic information to be displayed, the system microcomputer 140 terminates the inputting process to the buffer (ST605->ST607, or ST601->ST607).

The system microcomputer 140 controls the image display device 150, and displays the graphic information on the display 120 in the order inputted to the buffer in accordance with the predetermined display information (position information, layout information (straight or curved layout, and the like), layout interval information, and the like) for displaying the graphic information) (ST607->ST608).

For example, in a case where there are icons [A] to [Z] indicating the setting conditions, when the item for displaying a certain setting condition of the apparatus is selected, the system microcomputer 140 sequentially confirms the setting conditions of the respective corresponding sections within the apparatus, in accordance with the order (priority) defined in the table data of the storing section (memories), and judges whether or not the respective corresponding icons are displayed.

And, the system microcomputer 140 sequentially inputs the graphic information of the icons to be displayed to the buffer of the image display device 150, and when a predetermined setting condition is confirmed, the system microcomputer 140 displays the graphic information within the buffer on the display 120 in accordance with predetermined position information and layout information.

Figure 21A:
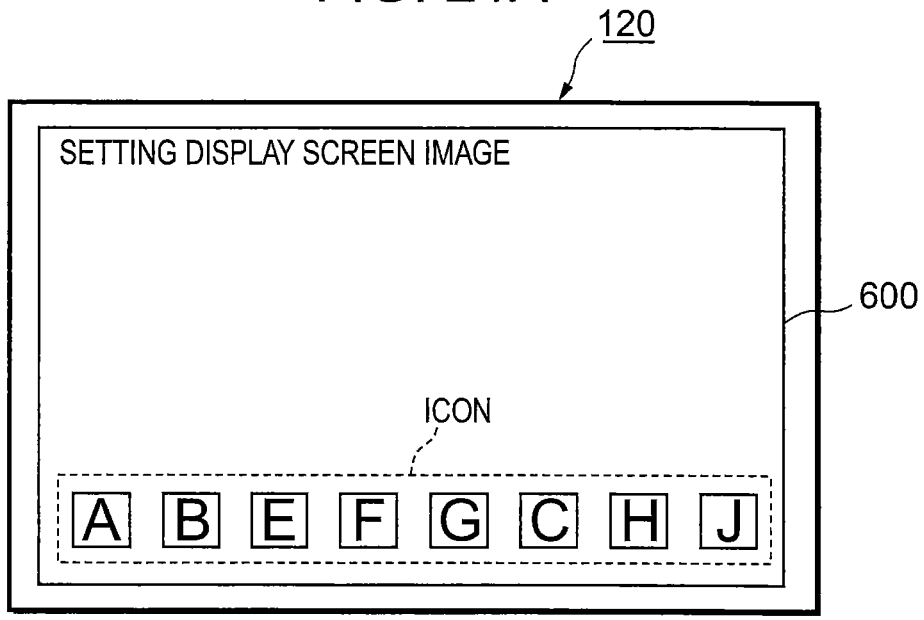
FIG. 21A to FIG. 21B are explanation views for explaining the GUI screen image displayed in accordance with the flowchart of FIG. 20.
Figure 21B:
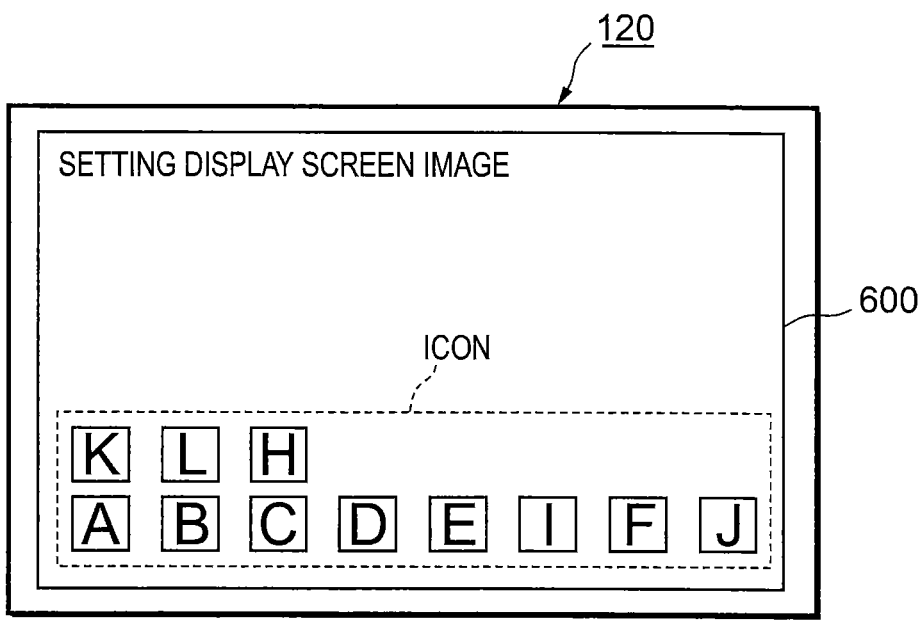

For example, as shown on a setting display screen image 600 of FIG. 21A, the icons are lined up and displayed on the lower portion of the screen image, in the order of [A], [B], [E], [F], [G], [C], [H] and [J]. In addition, in a case where they can not be displayed in a single line, as shown in FIG. 21B, remaining icons are lined up and displayed at a higher position.

In a case of the conventional screen image display, the icons are displayed on the bottom portion of the screen image not in the order based on the apparatus condition and unnecessary icons are displayed, because the order is defined as [A], [B], [C], [D], [E], [F], [G] and [H]. However, in a case of the screen image display as described above, even in a case where there are a large number of icons and character information and the like, the icons and character information which are required in accordance with the apparatus condition are displayed on the display in a predetermined layout.

[7]: Overlap Display

Figure 22:
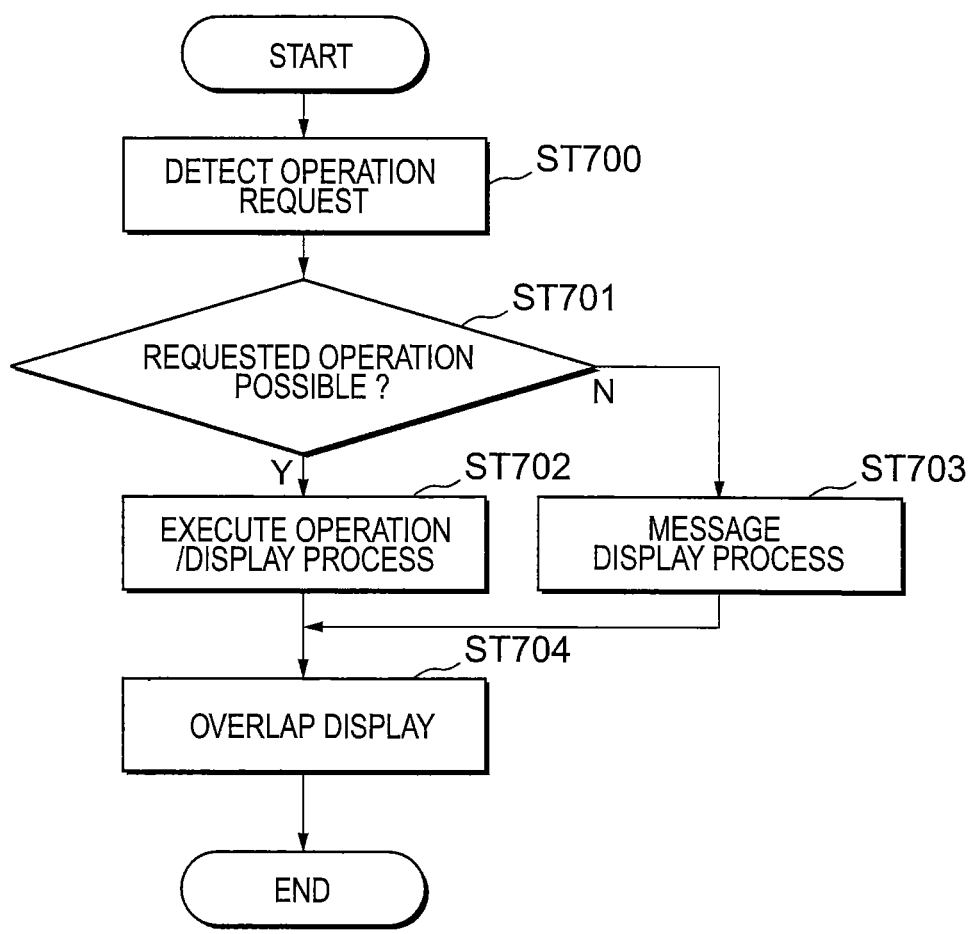
FIG. 22 is a flowchart showing the operation steps when the GUI screen image is overlap-displayed in the imaging apparatus shown in FIG. 2.

Next, operation at the time of displaying a different GUI screen image on the display on which the screen image display is performed will be described with reference to a flowchart of FIG. 22.

For example, under the condition that an image currently being imaged is displayed on the display 120, the system microcomputer 140 is in a condition of detecting whether or not the operating section 130 or the LCD panel is operated, namely, in a standby condition of waiting for the detection of the control signal from the operating section 130 or the GUI section 125.

When the operating section 130 is operated or the LCD panel is touched to carry out a predetermined operation in such a condition, the predetermined control signal is sent from the operating section 130 or the GUI section 125 to the system microcomputer 140 (ST700).

The system microcomputer 140 judges whether or not the operation and display process in accordance with this control signal are possible upon receiving the control signal from the operating section 130 or the GUI section 125 (ST700->ST701).

In a case where the operation and the display process can be performed, the system microcomputer 140 controls the image display device 150, generates a layer screen image, such as an operation screen image for executing the predetermined operation or a message screen image for carrying out the display of the message and the like, to overlap-display this layer screen image on the forefront of the screen image currently being displayed on the display 120 (ST701->ST702->ST704).

It is noted that, by changing the brightness and coloration of the layer screen image or the screen image to be overlapped, the layer screen image that is overlap-displayed on the forefront is made visually striking.

On the other hand, in a case where the operation and the display process can not be performed, the system microcomputer 140 controls the image display device 150, carries out a display process for an error message, generates the layer screen image serving as a predetermined message screen image to overlap-display this layer screen image on the forefront of the screen image currently being displayed on the display 120 (ST701->ST703->ST704).

The operations as described above are executed each time the operating section 130 is operated or the LCD panel is touched, and the layer screen image is overlap-displayed on the forefront of the screen image displayed on the display.

The specific example of the above-described GUI screen image will be described below.

For example, in a case where the image taking is started in the imaging apparatus 1, the system microcomputer 140 actuates the imaging apparatus 1 at the operation mode, for example, such as the operation mode to record on a video cassette (hereafter, referred to as a cassette) through the power switch 170 when the power switch 170 is used to turn on a desired operation mode.

Figure 23A:
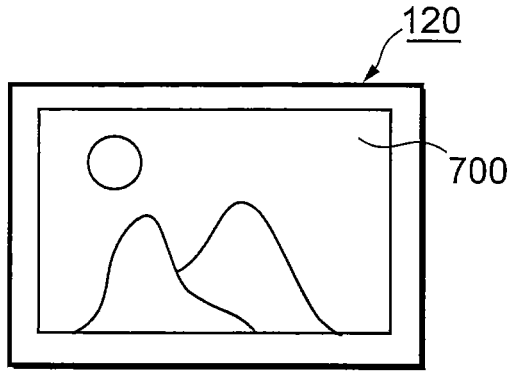
FIG. 23A to FIG. 23C are explanation views for explaining the GUI screen image displayed in accordance with the flowchart of FIG. 22.

When the imaging apparatus 1 is started in a desired operation mode as shown in FIG. 23A, an image signal obtained by the imaging section 110 is sent through the system microcomputer 140 to the image display device 150, and the image display device 150 displays this image signal as an imaging screen image 700 on the display 120.

Figure 23B:
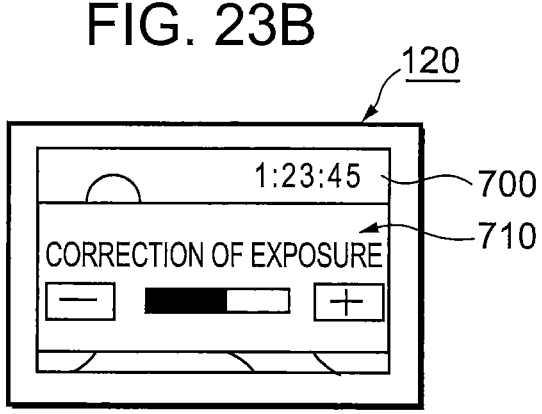

Here, in a case where the exposure correction for the imaging screen image 700 displayed on the display 120 is carried out, for example, when the operating section 130 is operated or the LCD panel is touched to execute the operation of [Setting of Exposure Correction], the system microcomputer 140 controls the image display device 150, generates the GUI screen image to set an exposure value shown in FIG. 23B as a layer screen image 710, and then overlap-displays on the front surface of the imaging screen image 700 of FIG. 23A.

And, when the operating section 130 is operated or the LCD panel is touched to operate the [+] button or the [−] button on the layer screen image 710, namely, on the GUI screen image of the [Setting of Exposure Correction], it can be set so as to obtain a desired exposure value.

Figure 23C:
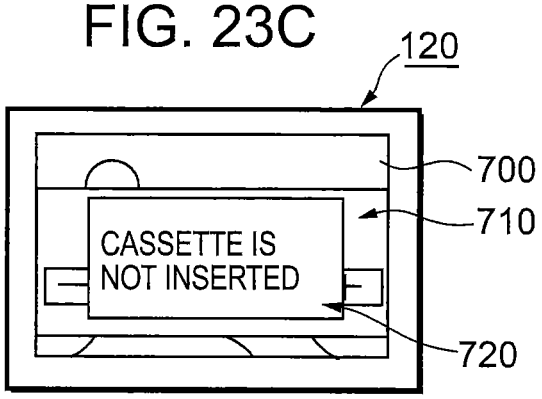

Additionally, under the condition that the layer screen image 710 of FIG. 23B is overlap-displayed, when the recording of the image is tried to be started, the system microcomputer 140 executes a message display process, controls the image display device 150, generates a layer screen image 720 to display a message such as [Cassette Is Not Inserted] as shown in FIG. 23C if the cassette is not inserted into the apparatus, and then overlap-displays on the front surface of the layer screen image 710 displayed on the display 120.

And, if a cassette is set or a predetermined time elapses, the overlap-display of the layer screen image 720 overlap-displayed on the layer screen image 710 is closed, and it returns back to the condition of FIG. 23B.

In this way, when the operating section 130 is operated or the LCD panel is touched to select the operation, the system microcomputer 140 generates the layer screen image (the GUI screen image) corresponding to the selected operation and overlap-displays it on the forefront of the display 120.

Figure 24A:
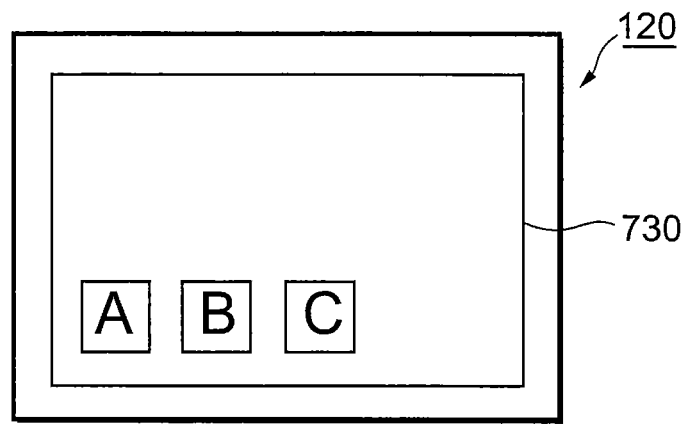
FIG. 24A to FIG. 24B are explanation views for explaining the display screen image displayed in accordance with the flowchart of FIG. 22.

In addition, for example, as shown in FIG. 24A, a display screen image 730 on which icons [A], [B] and [C] representing predetermined functions are displayed is displayed on the display 120. A case where a function of one among them, for example, the icon [B], is temporarily invalidated is explained.

Figure 24B:
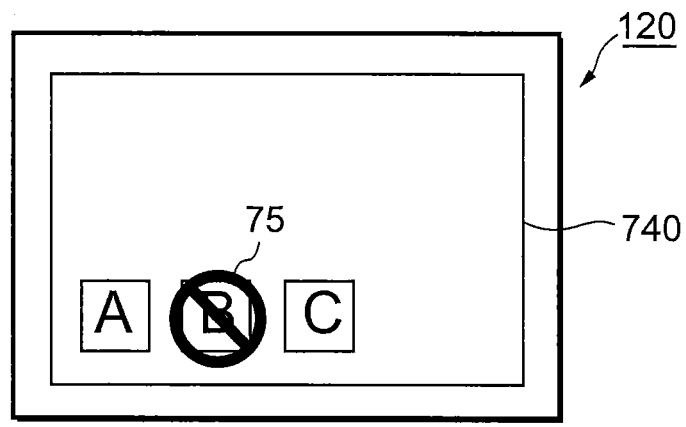

At first, when the operating section 130 is operated or the LCD panel is touched to [Invalidate] the function of the icon [B], the system microcomputer 140 controls the image display device 150 in accordance with this operation, and generates an icon 75 indicating failure of the displayed icon [B] to overlap-display the icon 75 on the icon [B] as shown in FIG. 24B.

And, when the operating section 130 is operated or the LCD panel is touched to [Validate] the function of the icon [B], the system microcomputer 140 controls the image display device 150 in accordance with this operation, erases the overlap displaying of the icon 75 to return to the state of FIG. 24A.

In this way, the overlap-display can be performed even on the graphic information such as the icon, the character information and the like. Similarly to the above-described case, as for the icons and the character information, the displaying condition can be variously arranged by combining and changing the color, the brightness, the shape and the like.

For example, in a case of recording character information (a title and the like) on the lead of the image to be recorded or the like, it is possible that the character information is inputted and overlap-displayed, where the character information is conspicuously displayed in a preparing stage until the recording is started, and the character information after recording is started is made unnoticeable by changing the color, the brightness, the shape and the like.

[8]: Folder Selection

Figure 25:
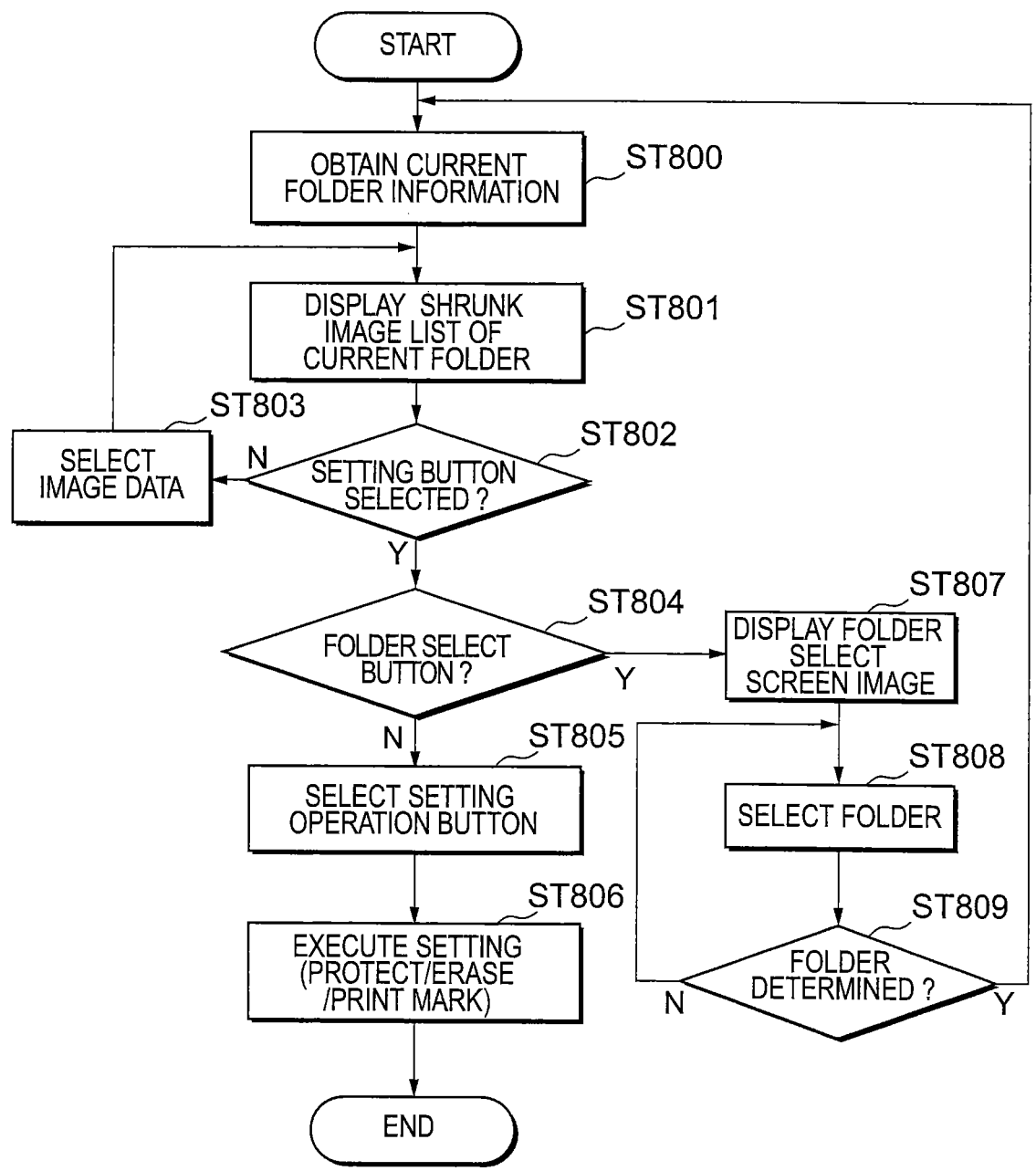
FIG. 25 is a flowchart showing the operation when a folder or image data in the folder is selected and operated in the imaging apparatus shown in FIG. 2.

Next, operation at the time of selecting a folder of a recording apparatus or a recording medium will be described with reference to a flowchart of FIG. 25.

At first, in order to select a folder recorded in the recording apparatus 160 or the sub-recording apparatus 165 and the recording medium, the operating section 130 is operated or the LCD panel is touched to select a predetermined icon or menu information displayed on the display 120.

When the predetermined icon or menu information is selected, the operating section 130 or the GUI section 125 sends out a predetermined control signal to the system microcomputer 140.

The system microcomputer 140 obtains image data information of a current folder of the recording apparatus 160 or the sub-recording apparatus 165 in response to the control signal from the operating section 130 or the GUI section 125 (ST800).

It is noted that a folder denotes a predetermined recording area (a storage space) in a recording apparatus or a recording medium for classifying, arranging, unifying and managing a plurality of image data, and a current folder denotes a folder that can be accessed.

And, when obtaining the image data information of the current folder, the system microcomputer 140 controls the image display device 150, generates index image information of the image data recorded in the current folder of the recording apparatus 160 or the sub-recording apparatus 165, and displays a GUI screen image 800 based on the generated index image information on the display 120 (ST801).

It is noted that index image information is information in which reduced image data of respective recorded image data can be generated and list-displayed.

Figure 26:
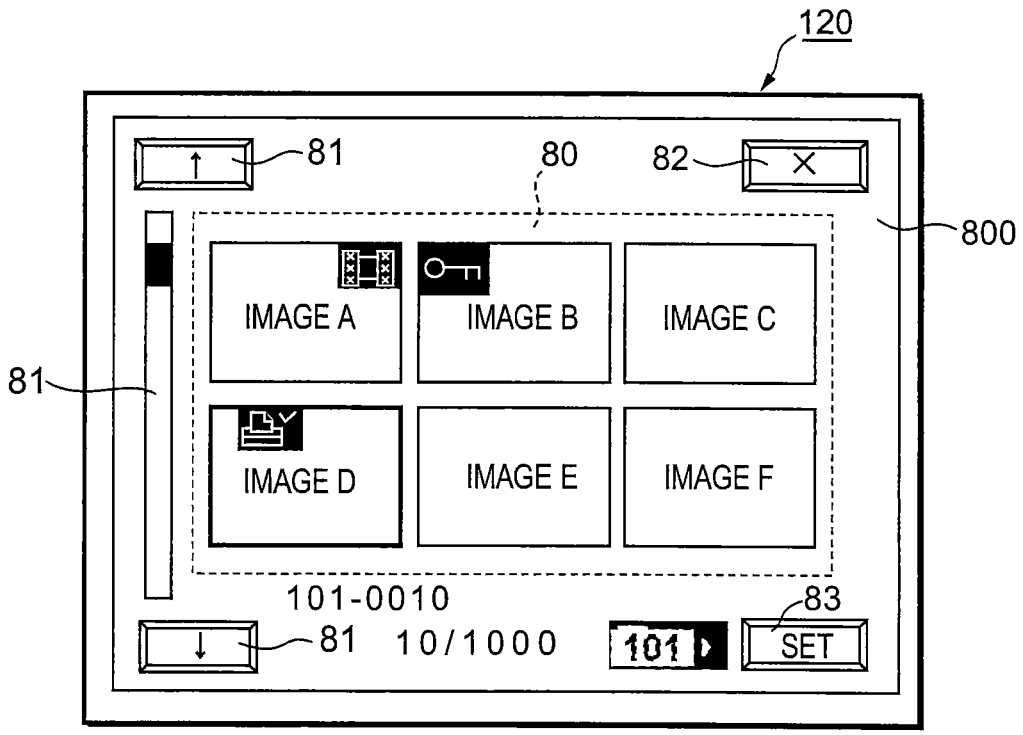
FIG. 26 is an explanation view for explaining the GUI screen image displayed in accordance with the flowchart of FIG. 25.

For example, as shown in FIG. 26, the GUI screen image 800 is provided with an image display section 80 for displaying index image information, a [Select] button 81 for selecting desired image data, an [End] button 82 for closing the GUI screen image 800, and a [Set] button 83 for calling out [Set Screen] for performing a setting operation on the selected image data.

When the GUI screen image 800 is displayed, it becomes in a state of detecting a button to be operated (ST802).

Here, when the operating section 130 is operated or the LCD panel is touched to operate the selection button 81, the operating section 130 or the GUI section 125 sends out a predetermined control signal to the system microcomputer 140.

The system microcomputer 140 controls the image display device 150 in response to the control signal from the operating section 130 or the GUI section 125, sequentially changes the displayed condition of the reduced image data displayed on the image display section 80, and clearly indicates the selected image data (ST802->ST803->ST801->ST802).

On the other hand, when the operating section 130 is operated or the LCD panel is touched to select and operate the [Set] button 83, the operating section 130 or the GUI section 125 sends out a predetermined control signal to the system microcomputer 140.

The system microcomputer 140 controls the image display device 150 in response to the control signal from the operating section 130 or the GUI section 125, generates a GUI screen image 810 of the [Set Screen] to perform the setting operation on the image data to overlap-display it on the GUI screen image 800 displayed on the display 120 (ST802->ST804).

Figure 27:
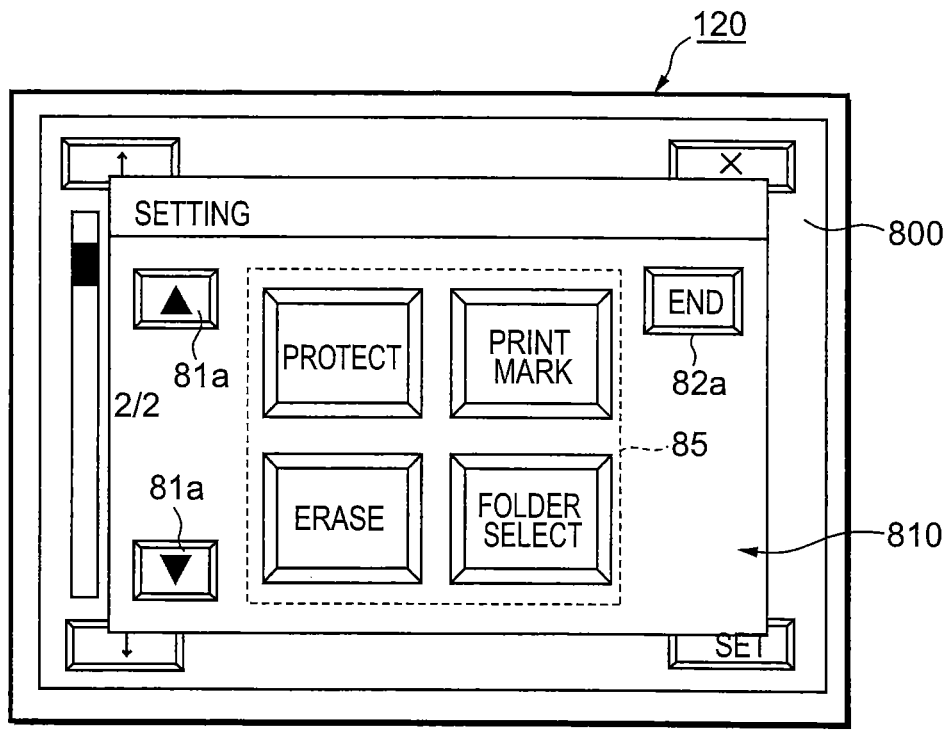
FIG. 27 is an explanation view for explaining the GUI screen image displayed when a [Set] button is operated on the GUI screen image of FIG. 26.

For example, as shown in FIG. 27, the GUI screen image 810 is composed of a [Select] button 81a for selecting a desired button from a setting operation button group 85, an [End] button 82a for closing the [Set Screen], and the setting operation button group 85 for performing the setting operation on the image data.

The setting operation button group 85 is composed of, for example, a [Protect] button for prohibiting erasure of the selected image data, an [Erase] button for erasing the selected image data, a [Print Mark] button for setting a print mark for the selected image data, a [Folder Select] button for moving to a different folder, and the like.

When the GUI screen image 810 is displayed, it becomes in a state for detecting a button to be operated (ST804).

Here, when the operating section 130 is operated or the LCD panel is touched to operate a button other than the [Folder Select] button from the setting operation button group 85, the operating section 130 or the GUI section 125 sends out a predetermined control signal to the system microcomputer 140 (ST804->ST805).

The system microcomputer 140 executes the setting of the operated button in response to the control signal from the operating section 130 or the GUI section 125 (ST805->ST806).

For example, if the [Protect] button of FIG. 27 is operated, the selected image data is set to the erasure prohibition. In addition, if the [Erase] button is operated, the selected image data is erased from the recording apparatus 160, and if the [Print Mark] button is operated, a print mark is set for the selected image data.

On the other hand, when the operating section 130 is operated or the LCD panel is touched to operate the [Folder Select] button from the setting operation button group 85, the operating section 130 or the GUI section 125 sends out a predetermined control signal to the system microcomputer 140.

The system microcomputer 140 controls the image display device 150 in response to the control signal from the operating section 130 or the GUI section 125, and generates a GUI screen image 820 for changing the current folder to display it on the display 120 (ST804->ST807).

Figure 28:
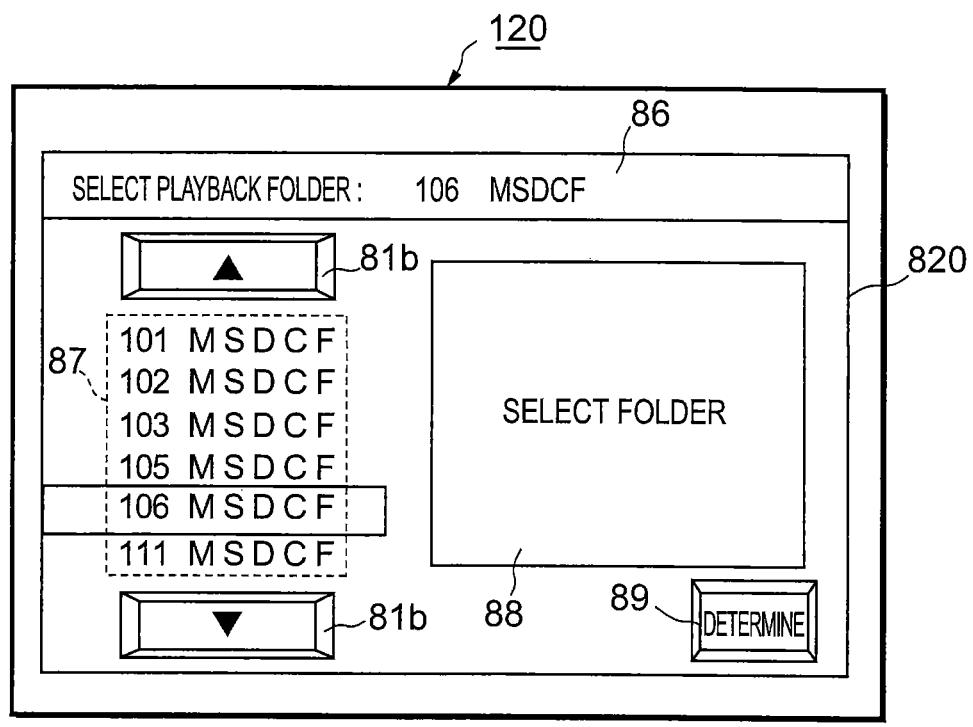
FIG. 28 is an explanation view for explaining the GUI screen image displayed when a [Folder Select] button is operated on the GUI screen image of FIG. 27.
Figure 29A:
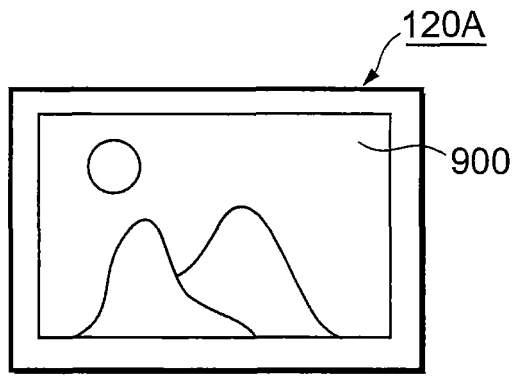
FIG. 29A to FIG. 29C are explanation views for explaining the displayed condition of the GUI screen image in a conventional imaging apparatus.
Figure 29B:
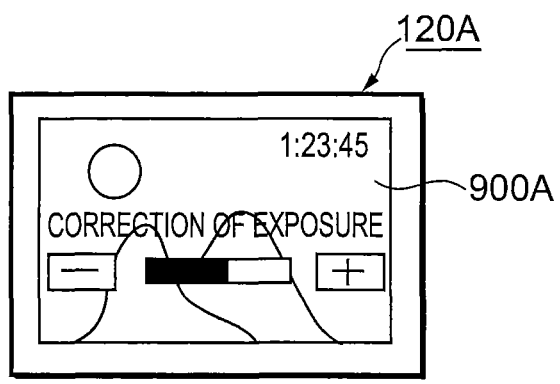
Figure 29C:
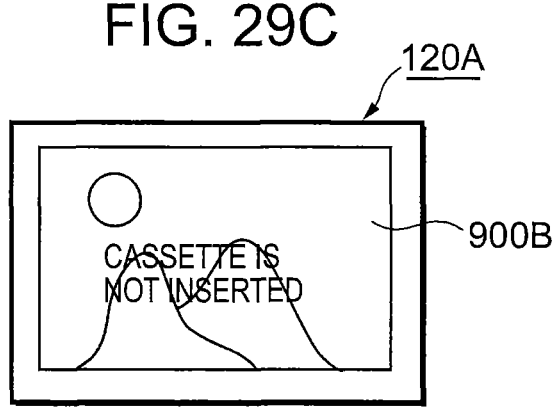

For example, as shown in FIG. 28, the GUI screen image 820 is composed of a [Select] button 81b for selecting a desired folder name, a folder name display section 86 for displaying the selected folder name, a folder display section 87 for displaying a folder name in the storing apparatus 160, an image data display section 88 for displaying an image data of the selected folder and the like, a [Determine] button 89 for determining the selected folder, and the like.

When the operating section 130 is operated or the LCD panel is touched to operate the [Select] button 81b on the GUI screen image 820, the operating section 130 or the GUI section 125 sends out a predetermined control signal to the system microcomputer 140.

The system microcomputer 140 controls the image display device 150 in response to the control signal from the operating section 130 or the GUI section 125, changes the displayed condition of the folder name to be displayed on the folder display section 87 and displays this folder name on the folder name display section 86 to clearly indicate the folder currently being selected and to display the image data recorded in the folder being selected on the image data display section 88. It is noted that in a case where a plurality of image data exist, the image data within the folder can be sequentially displayed on the image data display section 88 by operating the [Select] button 81b (ST807->ST808).

Here, when the operating section 130 is operated or the LCD panel is touched to operate the [Determine] button 89, the folder currently being selected is changed to the current folder (ST808->ST809).

Until the [Determine] button 89 is operated, it is in a standby state (ST809->ST808->ST809-> . . . ). When the current folder is changed, the system microcomputer 140 again obtains the image data information of the current folder in the recording apparatus 160 or sub-recording apparatus 165, generates the index image information of the image data recorded in the current folder, and displays the GUI screen image 800 based on the generated index image information on the display 120 (ST809->ST800->ST801-> . . . ).

As described above, the imaging apparatus of the present invention results in the following excellent effects.

The [Personal Menu] enables generation of the unique menu information, in which only items frequently used is selected, and the GUI screen image for the [Personal Menu] includes buttons for editing menu information and buttons for selecting the [Main Menu] so that it is possible to reach a target setting screen image with less number of steps and to edit the menu information with ease.

Arrangement of the button for selecting the [Personal Menu] at a higher stage of the hierarchical type [Main Menu] improves operability in menu selection.

The setting items can be seamlessly scroll-displayed on the GUI screen image, and the relation between the index information (symbol) and the setting item is also displayed on the screen, and the shift to the GUI screen image corresponding to this screen image display is possible so that operation with intuitiveness and less number of steps is made possible and the time and steps in selecting the setting item are greatly reduced.

On the GUI screen image, if the operation is not performed, only the [Return] button is displayed, and if the operation is performed, it is changed to the display of only the [Determine] button to determine that operation. Thus, only the operable button is displayed, and whether or not the operation is carried out on the GUI screen image currently being displayed is made clear, which enables operation without any question.

In addition, since the number of the buttons to be displayed is reduced, the space for the screen image is made larger and the design can be also unified, thereby improving the visibility of the GUI screen image.

In the GUI screen image for setting the numeric data, the range of the setting values corresponding to the respective setting items can be efficiently displayed and can be intuitively viewed, thereby improving the operability and the visibility.

It is possible to display only the necessary icons and character information in a predetermined layout condition, depending on the apparatus condition, so that the visibility of the display screen image is improved.

Since a screen image corresponding to the operation is overlap-displayed on the forefront of the GUI screen image being displayed, the screen image being displayed is not erased and the previously displayed screen image is displayed after the operation is ended. Thus, even if a plurality of screen images are overlap-displayed, it is possible to easily distinguish them and to reduce uncomfortable feeling to the user.

Furthermore, even in a case where a plurality of folders exist in the recording apparatus or the recording medium, the operability is improved at the time when the folder is selected or altered or when the image data in the folder is viewed.

The invention claimed is:

1. An imaging apparatus comprising:
    a GUI screen image generating unit configured to generate a first graphical user interface based on a current setting including a terminate button that is configured to terminate the GUI screen image when an operation command from the operating unit is not received by the controlling unit, and
    the GUI screen image generating unit configured to generate a second graphical user interface which replaces the terminate button with a determine button that is configured to determine the operation when the operation command from the operating unit is received by the controlling unit, wherein
    the operation command is received when the current setting is changed.

2. The imaging apparatus according to claim 1, further comprising:
    a storing unit that stores graphic data, wherein
        the GUI screen image generating unit displays the graphic data from the storing unit when a predetermined operation command from the operating unit is received by the controlling unit and transmitted to the GUI screen image generating unit to replace a terminate button with a determine button.

3. The imaging apparatus according to claim 2, wherein the graphic data stored by the storing unit is obtained by dividing a range of settable or adjustable numeric data into a plurality of ranges.

4. The imaging apparatus according to claim 3, wherein the storing unit stores setting intervals based on the divided respective ranges.

5. The imaging apparatus according to claim 4, wherein the storing unit stores changing shapes on a basis of a setting interval.

6. The imaging apparatus according to claim 3, wherein the GUI screen image generating unit generates the GUI screen image to set the numeric data in accordance with the read out graphic data to display the GUI screen image on the image display.

7. The imaging apparatus according to claim 6, wherein the GUI screen image generating unit generates the GUI screen image to set the numeric data in accordance with the read out graphic data to display the GUI screen image on the image display.

8. The imaging apparatus according to claim 2, wherein the storing unit includes graphic data, the graphic data being characters and figures that represent functions and setting information, table data for determining a priority for when to display the graphic data, and layout information of the graphic data.

* * * * *